US012136787B2

(12) United States Patent
Ikegami

(10) Patent No.: US 12,136,787 B2
(45) Date of Patent: Nov. 5, 2024

(54) SOCKET AND ELECTRONIC DEVICE

(71) Applicant: KYOCERA CORPORATION, Kyoto (JP)

(72) Inventor: Fumihito Ikegami, Funabashi (JP)

(73) Assignee: KYOCERA CORPORATION, Kyoto (JP)

( * ) Notice: Subject to any disclaimer, the term of this patent is extended or adjusted under 35 U.S.C. 154(b) by 316 days.

(21) Appl. No.: 17/639,287

(22) PCT Filed: Sep. 2, 2020

(86) PCT No.: PCT/JP2020/033239
§ 371 (c)(1),
(2) Date: Feb. 28, 2022

(87) PCT Pub. No.: WO2021/045090
PCT Pub. Date: Mar. 11, 2021

(65) Prior Publication Data

US 2022/0320799 A1 Oct. 6, 2022

(30) Foreign Application Priority Data

Sep. 2, 2019 (JP) ................................ 2019-159550

(51) Int. Cl.
*H01R 13/631* (2006.01)
*H01R 13/11* (2006.01)
(Continued)

(52) U.S. Cl.
CPC ....... *H01R 13/6315* (2013.01); *H01R 13/112* (2013.01); *H01R 13/41* (2013.01); *H01R 13/502* (2013.01)

(58) Field of Classification Search
CPC ......................... H01R 13/6351; H01R 13/112; H01R 13/502; H01R 13/41; H01R 12/716; H01R 12/73; H01R 12/91
(Continued)

(56) References Cited

U.S. PATENT DOCUMENTS 5,201,663 A * 4/1993 Kikuchi ............. H01R 13/6315 439/82
7,611,359 B2 * 11/2009 Tomizu .............. H01R 13/6315 439/74
(Continued)

FOREIGN PATENT DOCUMENTS

EP 0519264 A2 12/1992
EP 2835874 A1 2/2015
(Continued)

OTHER PUBLICATIONS

International Search Report and Written Opinion for PCT/JP2020/033239 issued Nov. 11, 2020.

*Primary Examiner* — Marcus E Harcum
(74) *Attorney, Agent, or Firm* — Duane Morris LLP

(57) ABSTRACT

A socket (10) includes a first insulator (20), a second insulator (30), and contacts (50). The first insulator (20) is in the form of a frame. The second insulator (30) is movable relative to the first insulator (20). The contacts (50) each include a support portion supported by the first insulator (20) and are disposed within the second insulator (30). The contacts (50) each include an elastic portion (54) and a movable portion (55). The elastic portion (54) is linked to the support portion and is located between the support portion and the second insulator (30). The movable portion (55) includes a contacting portion (**55*c*) for contact with a connection object (60). The movable portion (55) is farther than the elastic portion (54**) from a periphery of the second
(Continued)

insulator (30) and is movable relative to the second insulator (30).

7 Claims, 13 Drawing Sheets

(51) Int. Cl.
*H01R 13/41* (2006.01)
*H01R 13/502* (2006.01)

(58) Field of Classification Search
USPC ..................................................... 439/74, 248
See application file for complete search history.

(56) References Cited

U.S. PATENT DOCUMENTS

| | | | | |
|---|---|---|---|---|
| 7,862,345 | B2 * | 1/2011 | Fukazawa | H01R 12/716 439/74 |
| 8,821,174 | B2 * | 9/2014 | Kimura | H01R 13/6315 439/570 |
| 9,054,438 | B2 | 6/2015 | Endo et al. | |
| 9,397,432 | B2 * | 7/2016 | Yukutake | H01R 13/46 |
| 9,502,815 | B2 * | 11/2016 | Akiguchi | H01R 13/10 |
| 9,583,869 | B2 * | 2/2017 | Shindo | H01R 31/06 |
| 10,128,614 | B2 * | 11/2018 | Suzuki | H01R 13/11 |
| 10,490,958 | B2 * | 11/2019 | Aoki | H01R 24/60 |
| 10,686,273 | B2 * | 6/2020 | Ogura | H01R 13/502 |
| 2013/0084751 | A1 * | 4/2013 | Shindo | H01R 13/533 439/626 |
| 2013/0084752 | A1 * | 4/2013 | Fukushi | H01R 4/48365 439/626 |
| 2015/0132998 | A1 * | 5/2015 | Sato | H01R 13/6315 439/676 |
| 2016/0204536 | A1 * | 7/2016 | Doi | H01R 12/716 439/248 |
| 2016/0294089 | A1 * | 10/2016 | Kobayashi | H01R 13/187 |
| 2017/0222346 | A1 * | 8/2017 | Kobayashi | H01R 13/502 |
| 2017/0338592 | A1 * | 11/2017 | Doi | H01R 13/18 |
| 2018/0198234 | A1 * | 7/2018 | Takane | H01R 12/716 |
| 2018/0241155 | A1 | 8/2018 | Suzuki | |
| 2018/0287301 | A1 * | 10/2018 | Tanaka | H01R 24/60 |
| 2018/0337482 | A1 * | 11/2018 | Teruki | H01R 13/506 |
| 2018/0351297 | A1 * | 12/2018 | Suzuki | H01R 13/2492 |
| 2019/0052005 | A1 * | 2/2019 | Hasegawa | H01R 13/405 |
| 2019/0109396 | A1 | 4/2019 | Shimba | |
| 2019/0148884 | A1 * | 5/2019 | Sugiki | H01R 12/91 439/247 |
| 2019/0229455 | A1 * | 7/2019 | Shimoji | H01R 12/91 |
| 2020/0127410 | A1 * | 4/2020 | Shioda | H01R 43/24 |
| 2020/0295511 | A1 * | 9/2020 | Shioda | H01R 13/6315 |
| 2022/0320800 | A1 * | 10/2022 | Ikegami | H01R 13/41 |

FOREIGN PATENT DOCUMENTS

| | | | | |
|---|---|---|---|---|
| EP | 3413399 A1 | 12/2018 | | |
| JP | 2005050694 A | 2/2005 | | |
| JP | 2008108560 A | 5/2008 | | |
| JP | 2014026855 A | 2/2014 | | |
| JP | 2018015072 A1 | 2/2018 | | |
| JP | 2019021542 A | 2/2019 | | |
| JP | 2019114566 A | 7/2019 | | |
| WO | WO-2018034325 A1 * | 2/2018 | | H01R 12/91 |

* cited by examiner

SOCKET AND ELECTRONIC DEVICE

CROSS-REFERENCE TO RELATED APPLICATION

The present application claims priority to Japanese Patent Application No. 2019-159550, filed on Sep. 2, 2019, the content of which is incorporated by reference herein in its entirety.

TECHNICAL FIELD

The present disclosure relates to a socket and an electronic device.

BACKGROUND ART

Some known techniques relate to sockets for fit with the respective connection objects each including an insulator and a terminal stuck in the insulator. Such a socket includes a contact for electrical connection with the terminal of the connection object.

For example, a contact disclosed in PTL 1 is designed to remain reliably in contact with a male connector that undergoes displacement during or after the insertion of the male connector.

A socket disclosed in PTL 2 is designed such that a movable piece of a terminal is prevented from being deformed by excessive elongation in the assembly process in which a pin header (connection object) is fitted into the socket.

CITATION LIST

Patent Literature

PTL 1: Japanese Unexamined Patent Application Publication No. 2014-026855

PTL 2: Japanese Unexamined Patent Application Publication No. 2018-015072

SUMMARY OF INVENTION

A socket according to an embodiment of the present disclosure includes a first insulator, a second insulator, and contacts. The first insulator is in the form of a frame. The second insulator is disposed within the first insulator in a manner so as to be movable relative to the first insulator. The contacts each include a support portion supported by the first insulator. The contacts are disposed within the second insulator. The contacts each include an elastic portion and a movable portion. The elastic portion is linked to the support portion and is located between the support portion and the second insulator. The movable portion includes a contacting portion for contact with the connection object. The movable portion is farther than the elastic portion from a periphery of the second insulator and is movable relative to the second insulator.

An electronic device according to an embodiment of the present disclosure includes the socket.

DESCRIPTION OF EMBODIMENTS

Figure 1:
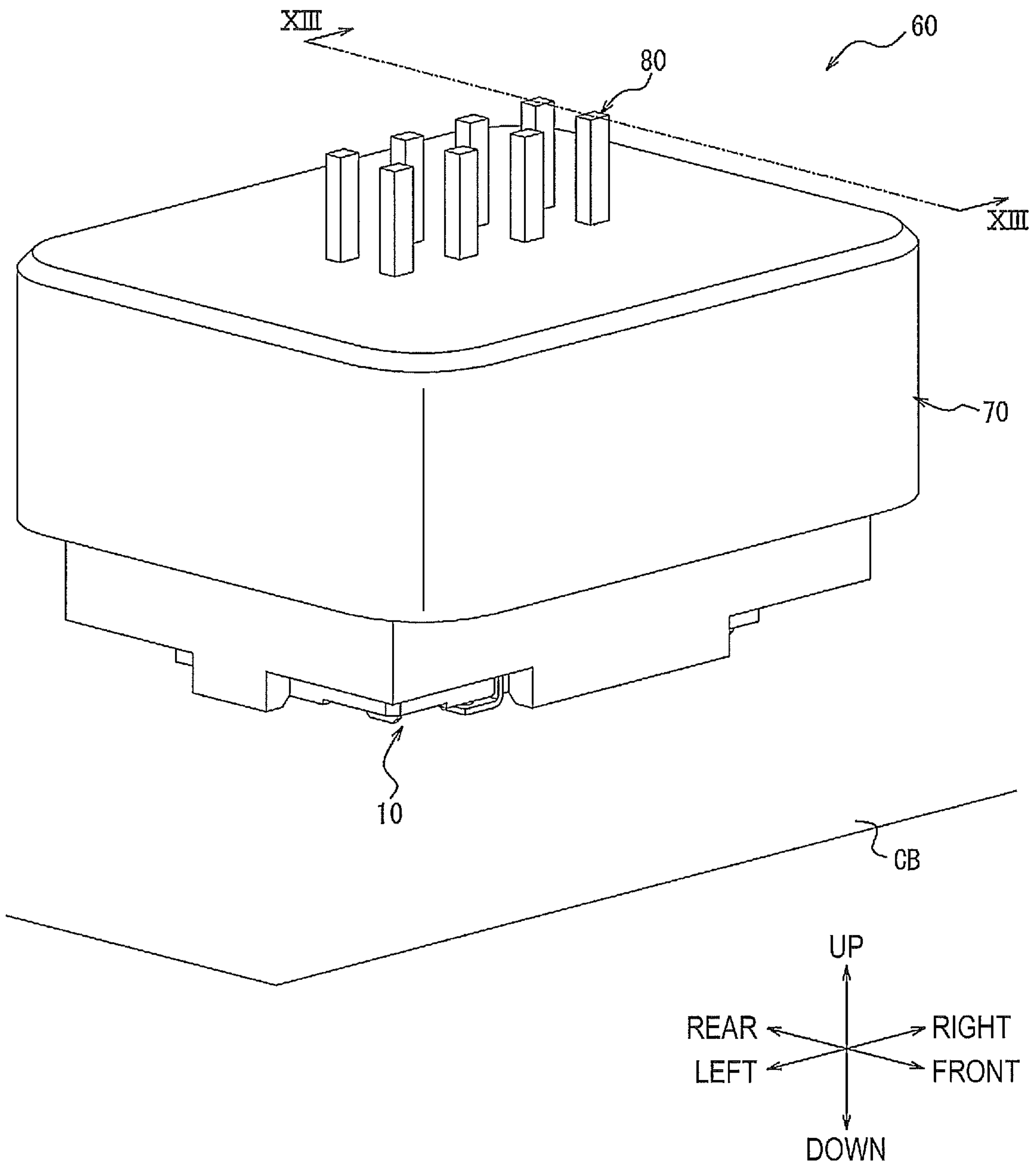
FIG. 1 is an external perspective view of a socket according to an embodiment, illustrating a state in which an upper surface of a connection object connected to the socket is viewed at an angle.

A conventional socket disclosed in PTL 1 includes an insulator and contacts. The contacts each include a terminal main body that is disposed within the insulator in a manner so as to be movable relative to the insulator. Owing to the terminal main body, the conventional socket is advantageous in that a female connection terminal is reliably kept in contact with a male connection terminal in light of misalignment of the male connection terminal. Unfortunately, the socket does not have a floating structure that accommodates misalignment between the socket and a connection object during, for example, automated assembling in which the socket and the connection object are connected together by assembling equipment. Thus, the connection between the socket and the connection object is not sufficiently reliable in light of possible misalignment between them.

A conventional socket disclosed in PTL 2 has such a floating structure. The socket includes a contact having a movable piece. However, the movable piece is fixed to a movable insulator such that the movable piece disposed within the mobile insulator is unable to move relative to the mobile insulator. Thus, such a conventional socket can fail to be reliably kept in contact with a terminal of a connection object due to misalignment of the terminal. As a result, the connection between the socket and the connection object is not sufficiently reliable in light of possible misalignment of the terminal of the connection object.

It can thus be concluded that these conventional sockets are designed without due consideration given to the reliability of the connection between the socket and the connection object in light of both the possible misalignment between the socket and the connection object and the possible misalignment of the terminal of the connection object.

A socket and an electronic device according to an embodiment of the present disclosure have both the advantage of achieving a good fit between the socket and a connection object and the advantage of improving the reliability of connection between the socket and the connection object.

An embodiment of the present disclosure will be described below in detail with reference to the accompanying drawings. The words “front”, “rear”, “left”, “right”, “up”, and “down” herein refer to directions indicated by the respective arrows in the drawings. The directions of the respective arrows are each consistent throughout all of the accompanying drawings. For convenience of illustration, a circuit board CB, which will be described later, is omitted from some of the drawings.

Figure 2:
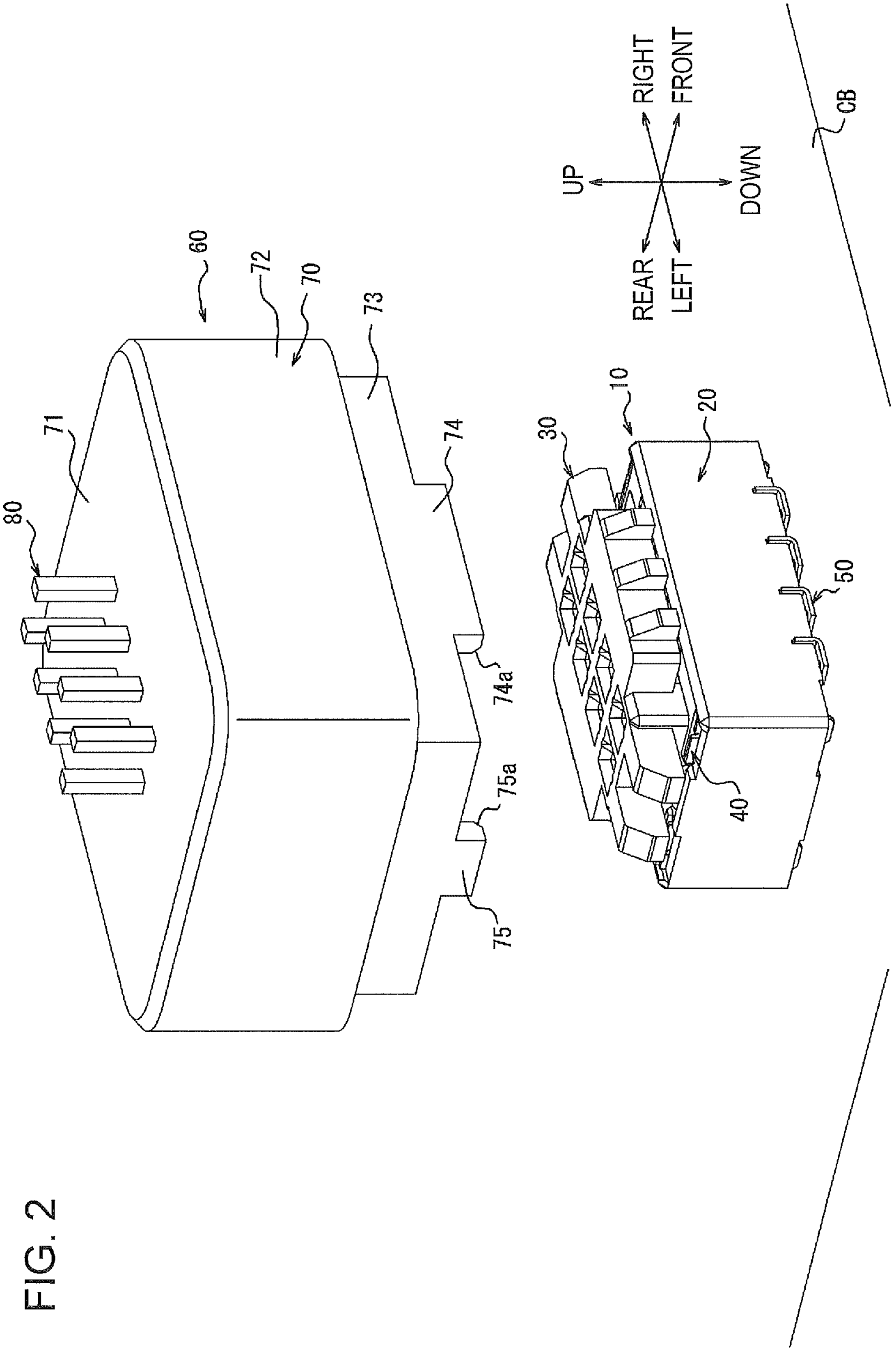
FIG. 2 is an external perspective view of the socket according to an embodiment, illustrating a state in which upper surfaces of the socket and the connection object disconnected from each other are viewed at an angle.

FIG. 1 is an external perspective view of a socket 10 according to an embodiment, illustrating a state in which an upper surface of a connection object 60 connected to the socket 10 is viewed at an angle. FIG. 2 is an external perspective view of the socket 10 according to an embodiment, illustrating a state in which upper surfaces of the socket 10 and the connection object 60 disconnected from each other are viewed at an angle.

The following describes an example in which the socket 10 according to an embodiment and the connection object 60 are a pin socket and a pin header, respectively. The connection object 60 in this example includes terminal 80, each of which is in the form of a pin. It is not required that the socket 10 and the connection object 60 be a pin socket and a pin header, respectively. For example, each of the terminals 80 of the connection object 60 is not necessarily in the form of a pin and may be in the form of blade. The socket 10 may be designed for connection with the connection object 60 including the terminals 80 each being in the form of a blade.

The socket 10 is mounted on the circuit board CB. The connection object 60 is electrically connected to a module. The socket 10 forms an electrical connection between the circuit board CB and the connection object 60 fitted to the socket 10 such that the module and the circuit board CB are electrically connected to each other. The circuit board CB may be a rigid substrate or any other desired circuit board, such as a flexible printed circuit board.

The socket 10 and the connection object 60 are designed to be connected to each other in a direction orthogonal to the circuit board CB. For example, the socket 10 and the connection object 60 are connected to each other in the up-and-down direction. Alternatively, the socket 10 and the connection object 60 may be connected to each other in a direction parallel to the circuit board CB.

The expression “extension direction of the movable portion” in the following description refers to, for example, an up-and-down direction. The expression “direction of fit between the connection object and the socket” in the following description refers to, for example, the up-and-down direction. The expression “projection direction of the biasing portion of the metal fitting” in the following description refers to, for example, a downward direction. The expression “direction orthogonal to the extension direction of the movable portion” in the following description refers to, for example, a front-and-rear direction. The expression “direction orthogonal to the direction of fit between the connection object and the socket” in the following description refers to, for example, the front-and-rear direction. The expression “short-side direction of the first insulator” in the following description refers to, for example, the front-and-rear direction. The expression “longitudinal direction of the first insulator” in the following description refers to, for example, a left-and-right direction. The expression “arrangement direction of the contacts” in the following description refers to, for example, the left-and-right direction.

The socket 10 according to an embodiment has a floating structure. The socket 10 allows the connection object 60 in the connected state to move relative to the circuit board CB. That is, the connection object 60 can move within a predetermined range relative to the circuit board CB when being connected to the socket 10.

Figure 3:
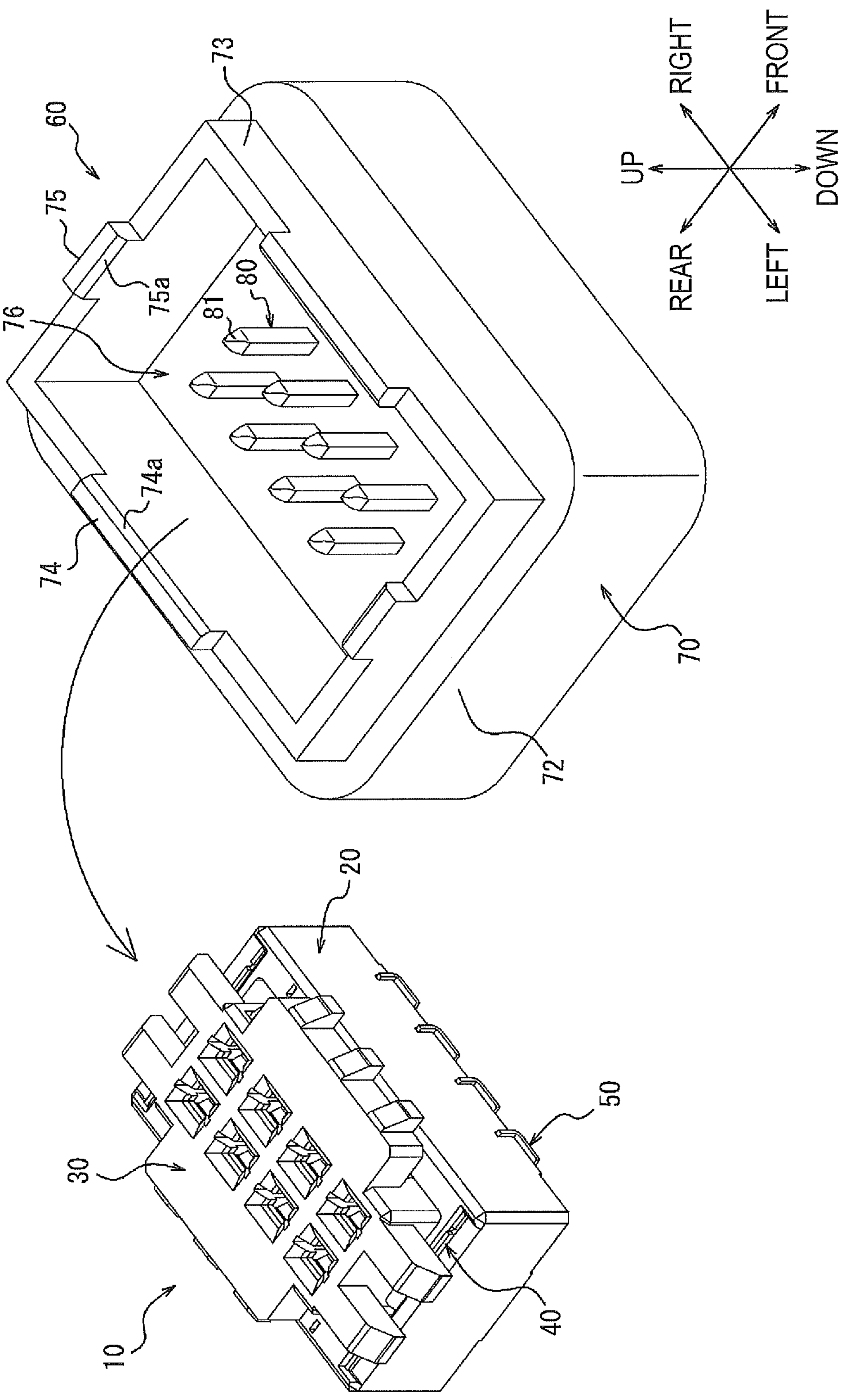
FIG. 3 is an external perspective view corresponding to FIG. 2, illustrating the socket with the connection object in FIG. 2 being turned upside down.

FIG. 3 is an external perspective view corresponding to FIG. 2, illustrating the socket 10 with the connection object 60 in FIG. 2 being turned upside down. The configuration of the connection object 60 intended for connection to the socket 10 according to an embodiment will be mainly described below with reference to FIGS. 2 and 3.

Referring to FIGS. 2 and 3, the connection object 60 includes an insulator 70 and the terminals 80. The insulator 70 and the terminals 80 of the connection object 60 may be integrally formed by insert molding. Alternatively, the connection object 60 may be assembled in such a manner that the terminals 80 are press-fitted into the insulator 70 from above or below.

The insulator 70 is a hollow member having the shape of a quadrangular cylinder and is made of an insulating and heat-resistant synthetic resin by injection molding. The insulator 70 defines an upper surface and includes an upper surface wall 71 and an outer peripheral wall 72. The terminals 80 are fitted to the upper surface, wall 71. The outer peripheral wall 72 projects in the up-and-down direction from an outer peripheral portion extending along a front edge, a rear edge, a left edge, and a right edge of the upper surface wall 71. The insulator 70 includes a frame portion 73, which is in the form of a frame and protrudes in the up-and-down direction from one of two peripheral portions that is farther than the other peripheral portion of the outer peripheral wall 72 from the upper surface wall 71.

The insulator 70 includes guide portions 74, which are protrusions on the front and rear of the frame portion 73 and each have a predetermined width. The guide portions 74 each include an inclined surface 74*a*, which is inclined obliquely downward while extending in the up-and-down direction toward the inside of the insulator 70. The insulator 70 also includes guide portions 75, which are protrusions on the left and the right of the frame portion 73 and each have a predetermined width. The guide portions 75 each include an inclined surface 75*a*, which is inclined obliquely downward while extending in the up-and-down direction toward the inside of the insulator 70.

The upper surface wall 71, the outer peripheral wall 72, the frame portion 73, the guide portions 74, and the guide portions 75 define an internal space of the insulator 70. The insulator 70 includes an accommodating portion 76, in which the socket 10 is disposed when the connection object 60 and the socket 10 are fitted together.

The terminals 80 are obtained by forming a desired metallic material into the shape illustrated in FIGS. 2 and 3. The terminals 80 are fixed to the insulator 70 in a manner so as to extend in the up-and-down direction through the upper surface wall 71 of the insulator 70. The terminals 80 are arranged in two rows lying side by side in the front-and-rear direction, and the terminals 80 in each row are arranged in the left-and-right direction. The terminals 80 are each in the form of a pin and each have a pointed end, which is herein referred to as a tip portion 81. The tip portions 81 of the terminals 80 are located within the accommodating portion 76 of the insulator 70.

Figure 4:
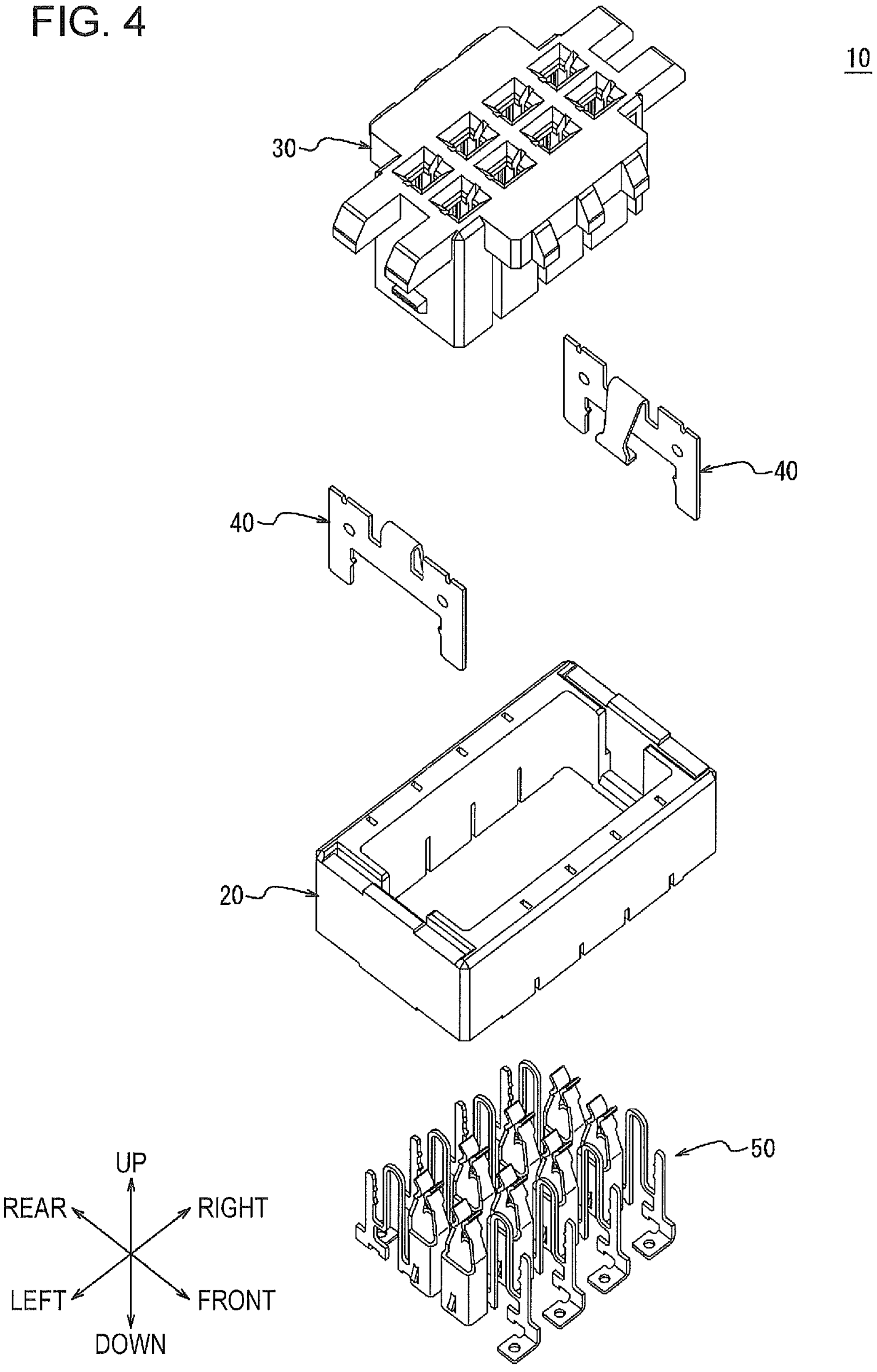
FIG. 4 is an exploded perspective view of the socket in FIG. 2, illustrating a state in which upper surfaces of parts of the socket are viewed at an angle.

FIG. 4 is an exploded perspective view of the socket 10 in FIG. 2, illustrating a state in which upper surfaces of parts of the socket 10 are viewed at an angle. The configuration of the socket 10 according to an embodiment will be mainly described below with reference to FIG. 4.

As illustrated in FIG. 4, the socket 10 includes a first insulator 20, a second insulator 30, metal fittings 40, and contacts 50, which are principal parts of the socket 10. The socket 10 may be assembled in the following manner. The metal fittings 40 are press-fitted into the first insulator 20 from above. The contacts 50 are press-fitted into the first insulator 20 from below. The second insulator 30 is then placed in the first insulator 20 in which the metal fittings 40 and the contacts 50 are press-fitted.

The following focuses on the configuration of the individual parts of the socket 10 in a state in which the metal fittings 40 and the contacts 50 are not elastically deformed.

Figure 5A:
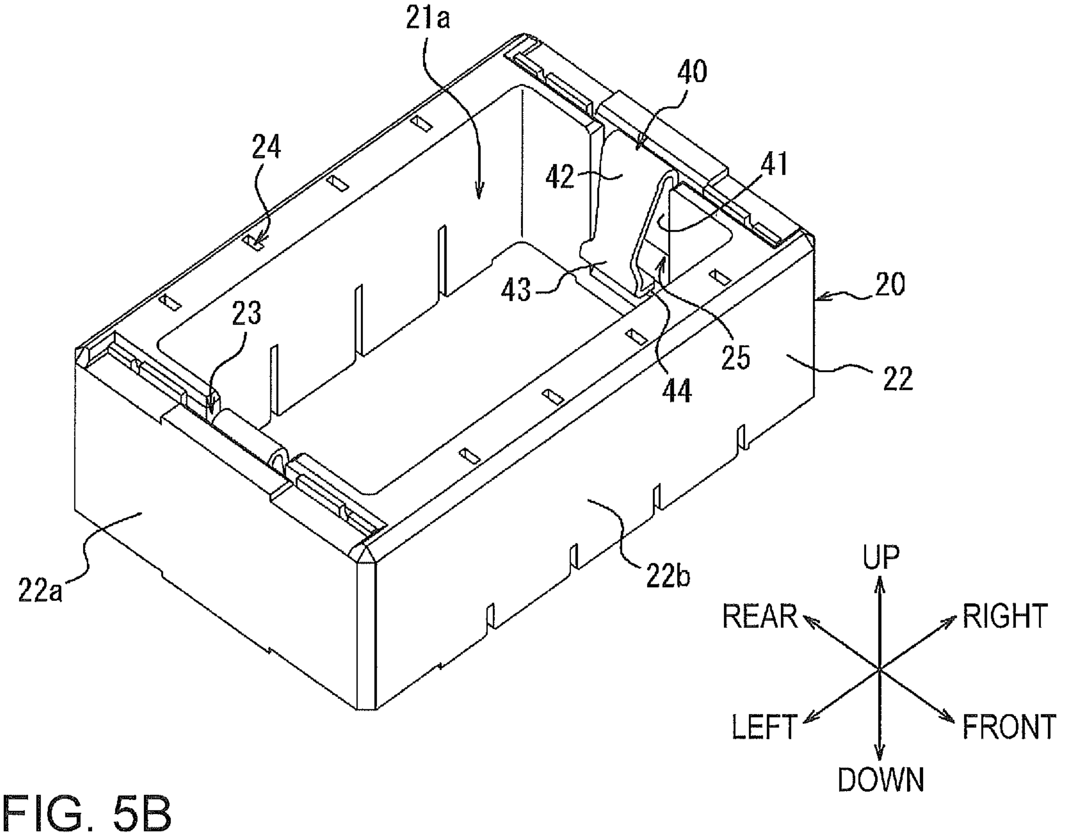
FIG. 5A is an external perspective view of a first insulator and metal fittings press-fitted in the first insulator, illustrating a state in which an upper surface of the first insulator is viewed at an angle.
Figure 5B:
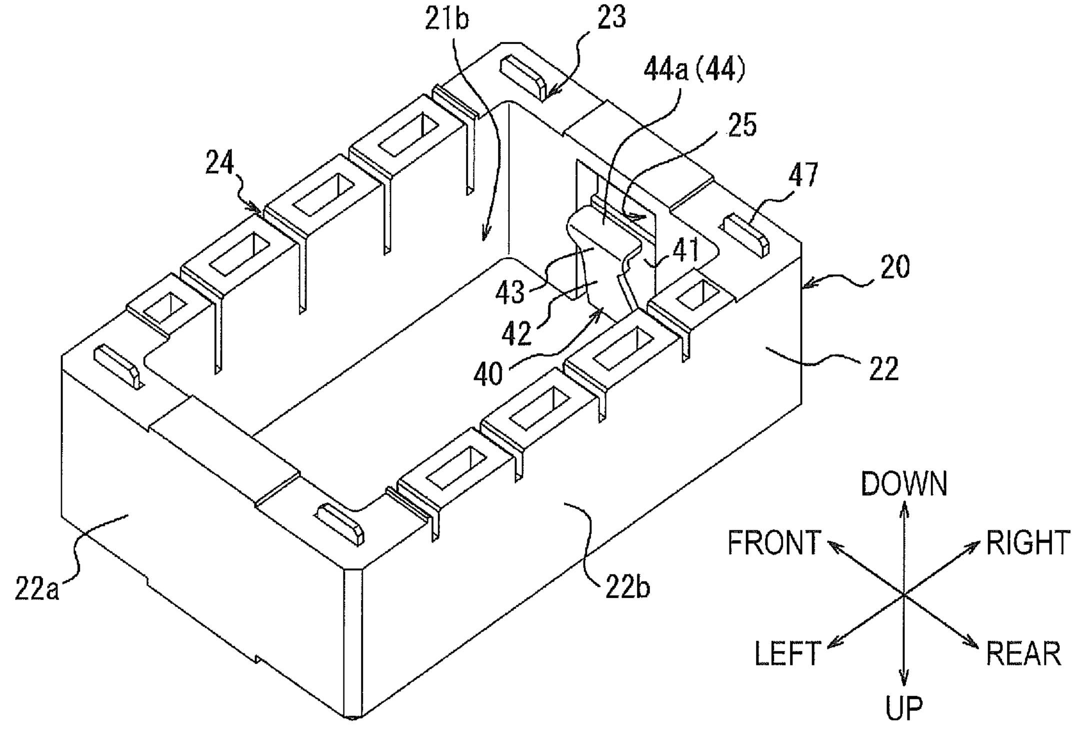
FIG. 5B is an external perspective view of the first insulator and the metal fittings press-fitted in the first insulator, illustrating a state in which a lower surface of the first insulator is viewed at an angle.

FIG. 5A is an external perspective view of the first insulator 20 and the metal fittings 40 press-fitted in the first insulator 20, illustrating a state in which the upper surface of the first insulator 20 is viewed at an angle. FIG. 5B is an external perspective view of the first insulator 20 and the metal fittings 40 press-fitted in the first insulator 20, illustrating a state in which a lower surface of the first insulator 20 is viewed at an angle. The configuration of the first insulator 20 will be mainly described below with reference to FIGS. 5A and 5B.

As illustrated in FIGS. 5A and 5B, the first insulator 20 has the shape of a rectangular cylinder and is made of an insulating and heat-resistant synthetic resin by injection molding. The first insulator 20 is in the form of a frame and is hollow. The first insulator 20 includes an opening 21*a* and an opening 21*b*, which are located on the upper and lower sides of the first insulator 20. The first insulator 20 includes an outer peripheral wall 22, which is composed of four side walls on the front, rear, left, and right of the first insulator 20 and surrounds the internal space of the first insulator 20. More specifically, the outer peripheral wall 22 is composed of two short side walls 22*a* on the left and right and two long side walls 22*b* on the front and rear. The short side walls 22*a* of the first insulator 20 include metal-fitting catch grooves 23, each of which extends from the upper side and all along the dimension of the corresponding one of the short side walls 22*a* in the front-and-rear direction. Each of the metal-fitting catch grooves 23 extends within the first insulator 20 and all along the dimension of the first insulator 20 in the up-and-down direction. The metal fittings 40 are caught in the respective metal-fitting catch grooves 23.

The long side walls 22*b* of the first insulator 20 each include contact catch grooves 24, which are arranged with a predetermined distance therebetween in the left-and-right direction and extend from the lower side. Each of the contact catch grooves 24 extends within the first insulator 20 and all along the dimension of the first insulator 20 in the up-and-down direction. The contacts 50 are caught in the respective contact catch grooves 24. The first insulator 20 includes accommodating portions 25, each of which is a recess in an inner surface of the corresponding one of the short side walls 22*a*. The accommodating portions 25 have a predetermined width in the front-and-rear direction and extends substantially all along the dimension of the first insulator 20 in the up-and-down direction.

Figure 6A:
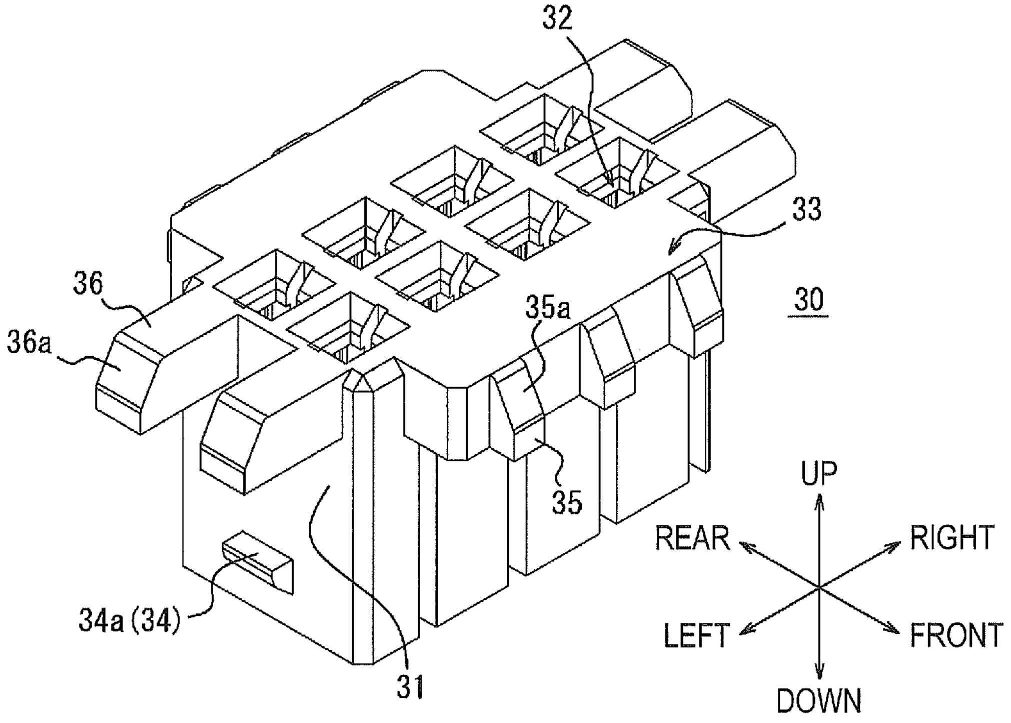
FIG. 6A is an external perspective view of only a second insulator in FIG. 4, illustrating a state in which an upper surface of the second insulator is viewed at an angle.
Figure 6B:
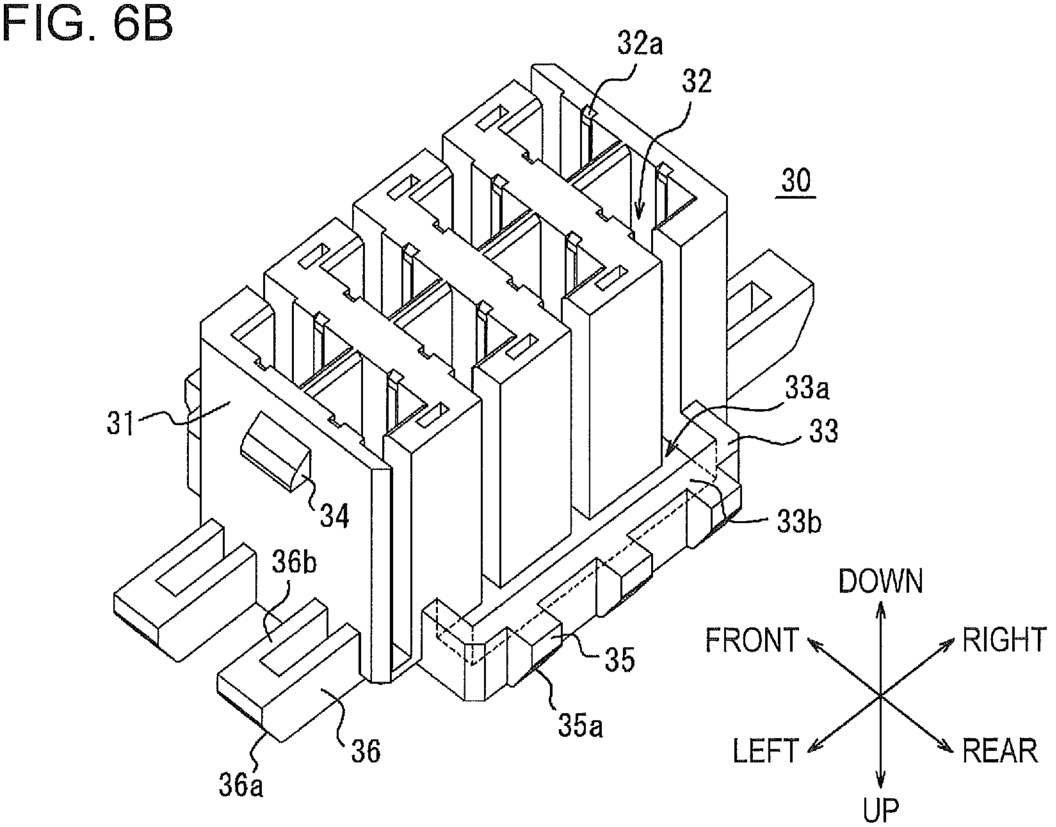
FIG. 6B is an external perspective view of only the second insulator in FIG. 4, illustrating a state in which a lower surface of the second insulator is viewed at an angle.

FIG. 6A is an external perspective view of only the second insulator 30 in FIG. 4, illustrating a state in which an upper surface of the second insulator 30 is viewed at an angle. FIG. 6B is an external perspective view of only the second insulator 30 in FIG. 4, illustrating a state in which a lower surface of the second insulator 30 is viewed at an angle. The configuration of the second insulator 30 will be mainly described below with reference to FIGS. 6A and 6B.

The second insulator 30 has the shape illustrated in FIGS. 6A and 6B and is made of an insulating and heat-resistant synthetic resin by injection molding. The second insulator 30 extends in the left-and-right direction. The second insulator 30 includes a base 31, which is a main body of the second insulator 30. The base 31 of the second insulator 30 includes first accommodating portions 32, which are arranged in two rows lying side by side in the front-and-rear direction. The first accommodating portions 32 in each row are arranged in the left-and-right direction. The first accommodating portions 32 are arranged with a predetermined distance therebetween in both the front-and-rear direction and the left-and-right direction. The first accommodating portions 32 each extend through the second insulator 30 in the up-and-down direction. The first accommodating portions 32 each include a pullout prevention target portion 32*a*, which is at a lower end of the midsection of the first accommodating portion 32 in the front-and-rear direction and includes part of an inner wall on the left and right of the first accommodating portion 32.

The second insulator 30 includes second accommodating portions 33, which protrude outward from upper end portions on the front and rear of the base 31 and extend in the left-and-right direction. The second accommodating portions 33 extend so as to be connected to the first accommodating portions 32. The second accommodating portions 33 each include a recess 33*a*, which is one step below in the direction from the lower side toward the upper side. Each second accommodating portion 33 extends all along the outer periphery of the corresponding recess 33*a* and includes a facing section 33*b*, which has a horizontal surface facing downward.

The second insulator 30 includes pullout prevention target portions 34, which extend outward from lower portions of side surfaces on the left and right of the base 31. The pullout prevention target portions 34 each have a horizontal surface 34*a*, which faces upward. The second insulator 30 includes first protrusions 35, which protrude outward from outer surfaces on the front and rear of the second accommodating portions 33. The first protrusions 35 on each side are arranged with a predetermined distance therebetween in the left-and-right direction. The first protrusions 35 each include a guide surface 35*a*, which is inclined outward in the front-and-rear direction while extending from the upper side toward the lower side.

The second insulator 30 includes second protrusions 36, which protrude outward from upper end portions on the left and right of the base 31. The second protrusions 36 on each side are arranged with a predetermined distance therebetween in the front-and-rear direction. The second protrusions 36 each include a guide surface 36*a*, which is inclined outward in the left-and-right direction while extending from the upper side toward the lower side. The second protrusion 36 each include a facing section 36*b*, which has a horizontal surface facing downward.

Figure 7:
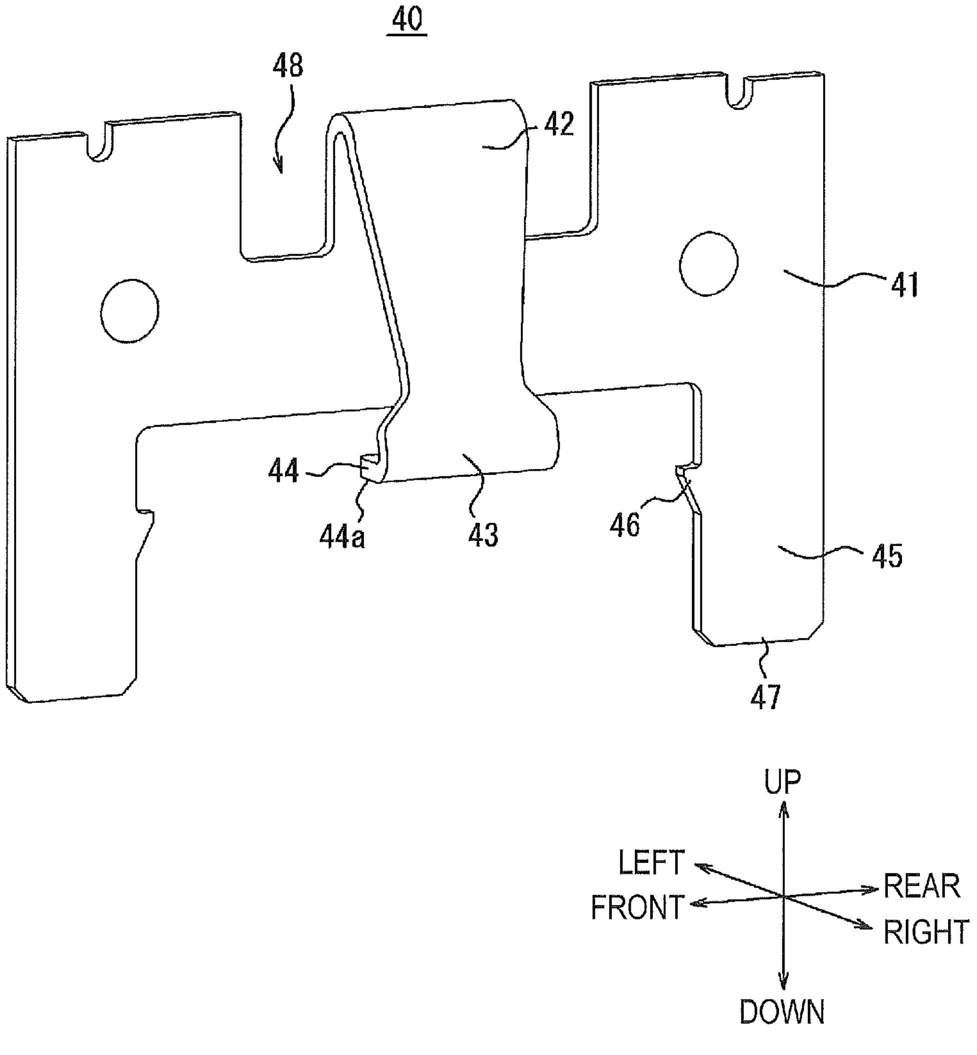
FIG. 7 is an external perspective view of one of metal fittings in FIG. 4, illustrating a state in which side surface of the metal fitting is viewed at an angle.

FIG. 7 is an external perspective view of one of the metal fittings 40 in FIG. 4, illustrating a state in which side surface of the metal fitting 40 is viewed at an angle. The configuration of the metal fitting 40 will be mainly described below with reference to FIG. 7.

A desired metallic material in the form of a thin sheet is processed into the shape illustrated in FIG. 4 by progressive die (stamping) to obtain the metal fitting 40. The procedure for forming the metal fitting 40 includes punching followed by a process of bending the sheet in the thickness direction. The metal fitting 40 includes a base 41, which is a main body of the metal fitting 40. The metal fitting 40 includes a biasing portion 42, which projects from the midsection of an upper edge portion of the base 41 and extends obliquely in a downward direction. The biasing portion 42 is bent into an inverted U-shape to project from the base 41 and extends obliquely in the projection direction toward the second insulator 30. The metal fitting 40 includes a contacting portion 43, which is provided to a lower end of the biasing portion 42. The metal fitting 40 includes a pullout-preventing portion 44, which is bent to project from a tip of the biasing portion 42 and extends toward the base 41. The pullout-preventing portion 44 has a horizontal surface 44*a*, which faces downward.

The metal fitting 40 includes a pair of projections 45. The projections 45 project from a front end and a rear end, respectively, of a lower edge portion of the base 41 in the direction of fit between the connection object 60 and the socket 10. The metal fitting 40 includes support portions 46, each of which is in the form of a claw and is provided to the midsection in the front-and-rear direction of an inner end portion of the corresponding one of the projections 45. The metal fitting 40 includes mounting portions 47, each of which is provided to a lower end of the corresponding one of the projections 45. The metal fitting 40 includes cutouts 48, which extend from the respective sides of a connection portion between the biasing portion 42 and the base 41. The cutouts 48 extend in the projection direction of the biasing portion 42 toward the inside of the base 41.

As illustrated in FIGS. 5A and 5B, each of the metal fittings 40 is press-fitted in the corresponding one of the metal-fitting catch grooves 23 of the first insulator 20 and is installed in the corresponding one of the short side walls 22*a* of the first insulator 20. More specifically, the support portions 46 of each metal fitting 40 are caught on the inner wall of the metal-fitting catch groove 23 such that the base 41 and the projections 45 of the metal fitting 40 are installed in the short side wall 22*a*. The mounting portions 47 at the lower end of the metal fitting 40 are exposed at a lower end of the metal-fitting catch groove 23 of the first insulator 20 and jut downward from the first insulator 20.

When the metal fitting 40 is fitted in the first insulator 20, the biasing portion 42, the contacting portion 43, the pullout-preventing portion 44, and the horizontal surface 44*a* are not hidden in the short side wall 22*a* of the first insulator 20 and are exposed on the inside of the first insulator 20. Each of the accommodating portions 25 of the first insulator 20 is a recess in an inner wall facing the pullout-preventing portion 44 of the corresponding one of the metal fittings 40 fitted in the first insulator 20. The accommodating portion 25 overlaps the pullout-preventing portion 44 and the horizontal surface 44*a* when viewed in the projection direction of the biasing portion 42.

Figure 8A:
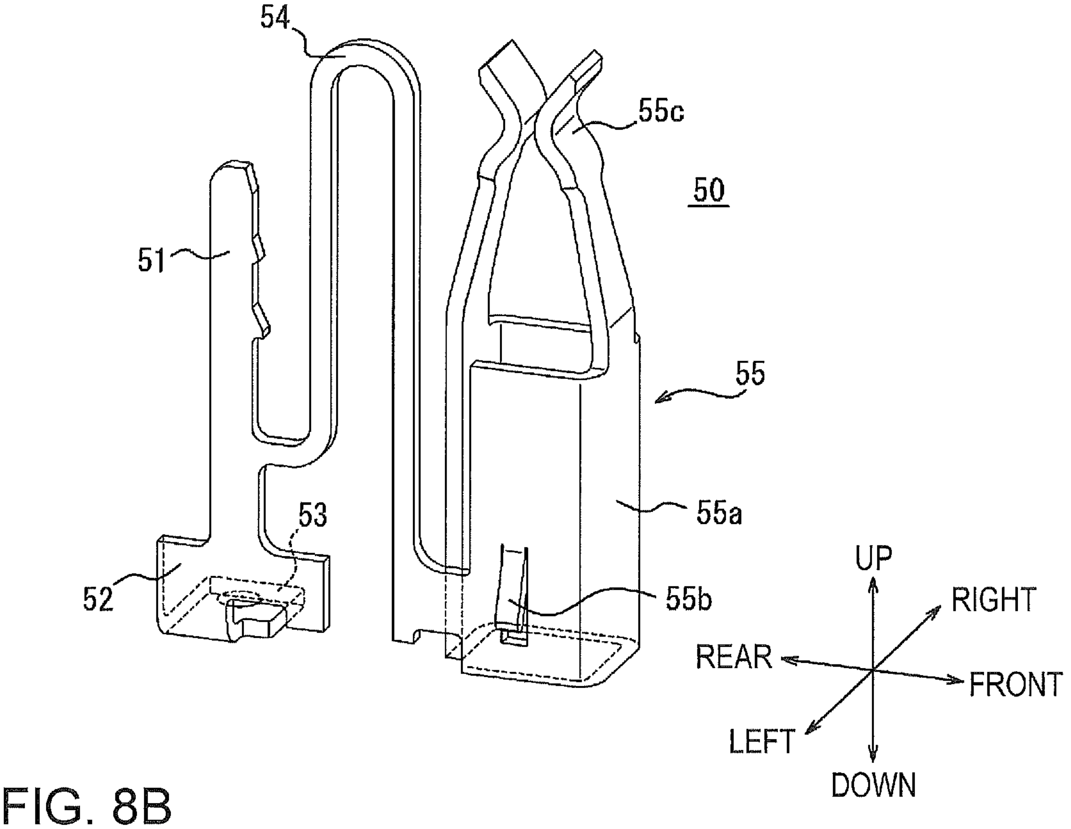
FIG. 8A is an external perspective view of one of contacts in FIG. 4, illustrating a state in which the contact is viewed in a certain direction.
Figure 8B:
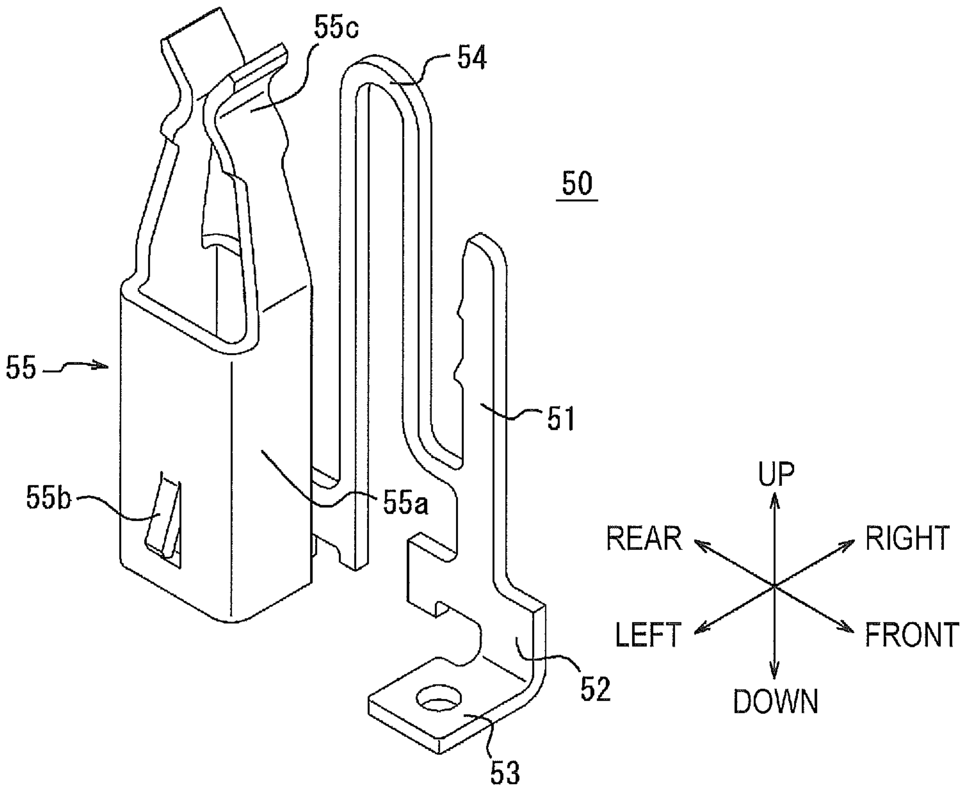
FIG. 8B is an external perspective view of one of the contacts in FIG. 4, illustrating a state in which the contact is viewed in another direction.

FIG. 8A is an external perspective view of one of the contacts 50 in FIG. 4, illustrating a state in which the contact 50 is viewed in a certain direction. FIG. 8B is an external perspective view of one of the contacts 50 in FIG. 4, illustrating a state in which the contact 50 is viewed in another direction. The configuration of the contact 50 will be mainly described below with reference to FIGS. 8A and 8B.

A metallic material being in the form of a thin sheet and having the spring elastic properties is formed into the shape illustrated in FIGS. 8A and 8B by progressive die (stamping) to obtain the contact 50. Examples of the metallic material include copper alloys, such as phosphor bronze, beryllium copper, copper-titanium alloys, and special copper alloys known as Corson alloys. The procedure for forming the contact 50 includes punching followed by a process of bending the sheet in the thickness direction. The contact 50 may be made of a metallic material of low elastic modulus so that the contact 50 changes significantly in shape due to elastic deformation. The contact 50 is primarily plated with nickel and is then plated with gold or tin.

As illustrated in FIGS. 8A and 8B, the contact 50 includes a first support portion 51, which extends in the up-and-down direction. The contact 50 includes a second support portion 52, which extends so as to be connected to a lower end of the first support portion 51. The contact 50 includes a mounting portion 53, which is bent into an L-shape to project in the left-and-right direction from a lower end of the second support portion 52.

The contact 50 includes an elastic portion 54, which is bent into an L-shape to project from the first support portion 51. The elastic portion 54 as a whole has an inverted U shape. The contact 50 includes a movable portion 55, which is connected to the elastic portion 54 in the front-and-rear direction. The movable portion 55 extends in the up-and-down direction.

The contact 50 includes a base 55*a*, which is part of the movable portion 55 and is connected the elastic portion 54. The base 55*a* has a rectangular shape when viewed in plan in the direction of fit between the connection object 60 and the socket 10. The contact 50 includes pullout-preventing portions 55*b*, which extend from lower portions of side surfaces on the left and right of the base 55*a* and are inclined downward so as to extend toward to outside of the base 55*a*. The contact 50 includes a pair of contacting portions 55*c*. The contacting portions 55*c* project upward from upper edges on the front and rear of the base 55*a*. The contacting portions 55*c* face each other in a direction orthogonal to the extension direction of the movable portion 55.

Figure 9:
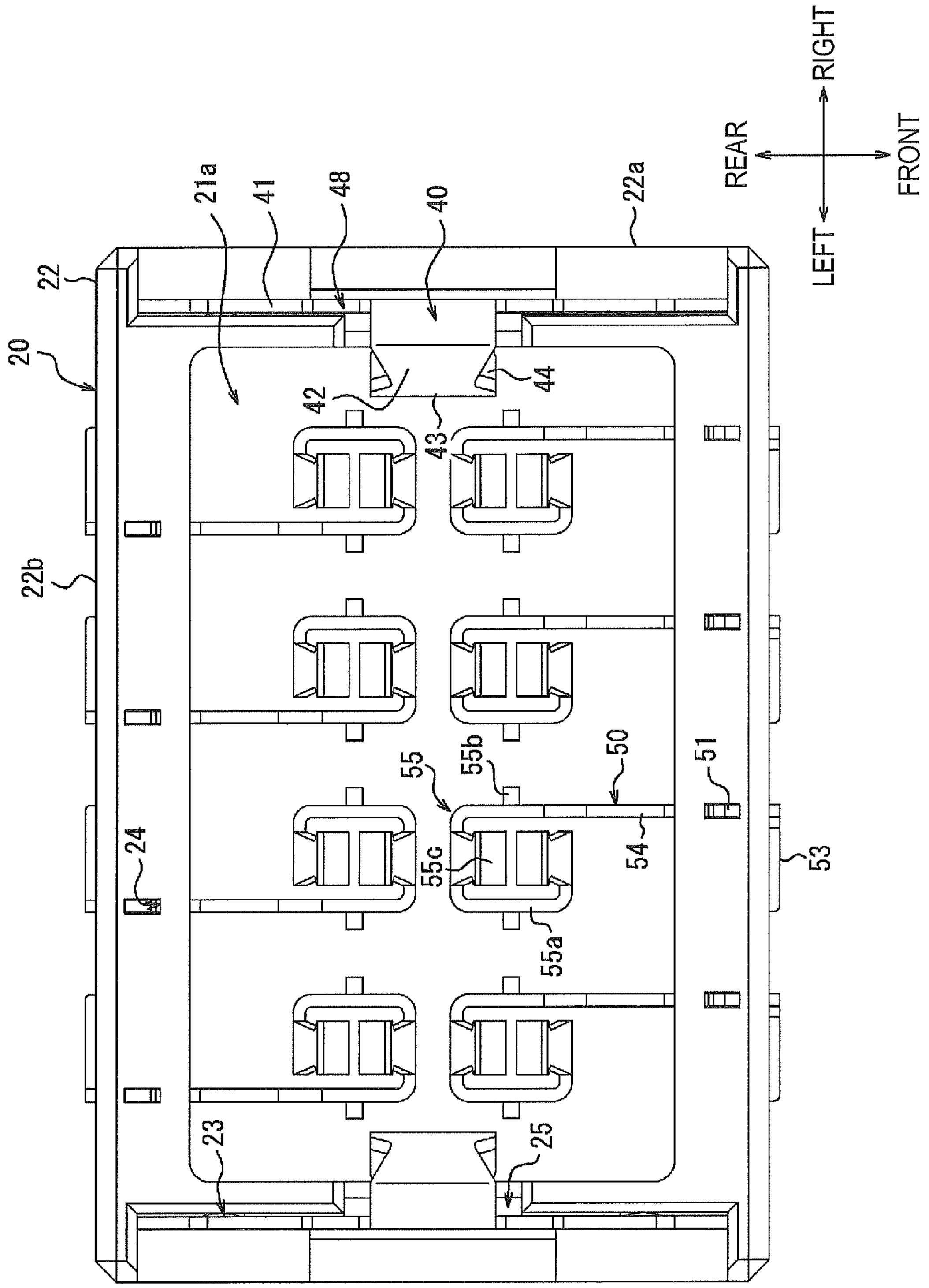
FIG. 9 is a top view of the first insulator, illustrating a state in which the metal fittings and the contacts are press-fitted in the first insulator.

FIG. 9 is a top view of the first insulator 20, illustrating a state in which the metal fittings 40 and the contacts 50 are press-fitted in the first insulator 20. The configuration of the contacts 50 that is relevant to the first insulator 20 will be mainly described below with reference to FIG. 9.

As illustrated in FIG. 9, the contacts 50 are arranged in two rows lying side by side in the short-side direction of the first insulator 20, and the contacts 50 in each row are arranged with a predetermined distance therebetween in the longitudinal direction of the first insulator 20. The left-right position of each contact 50 in the front row coincides with the left-right position of the neighboring contact 50 in the back row. Each contact 50 in the front row and the neighboring contact 50 in the back row are arranged symmetrically about a point located therebetween. The movable portions 55 of the contacts 50 each have a rectangular shape when viewed in plan in the extension direction of the movable portions 55.

Figure 10:
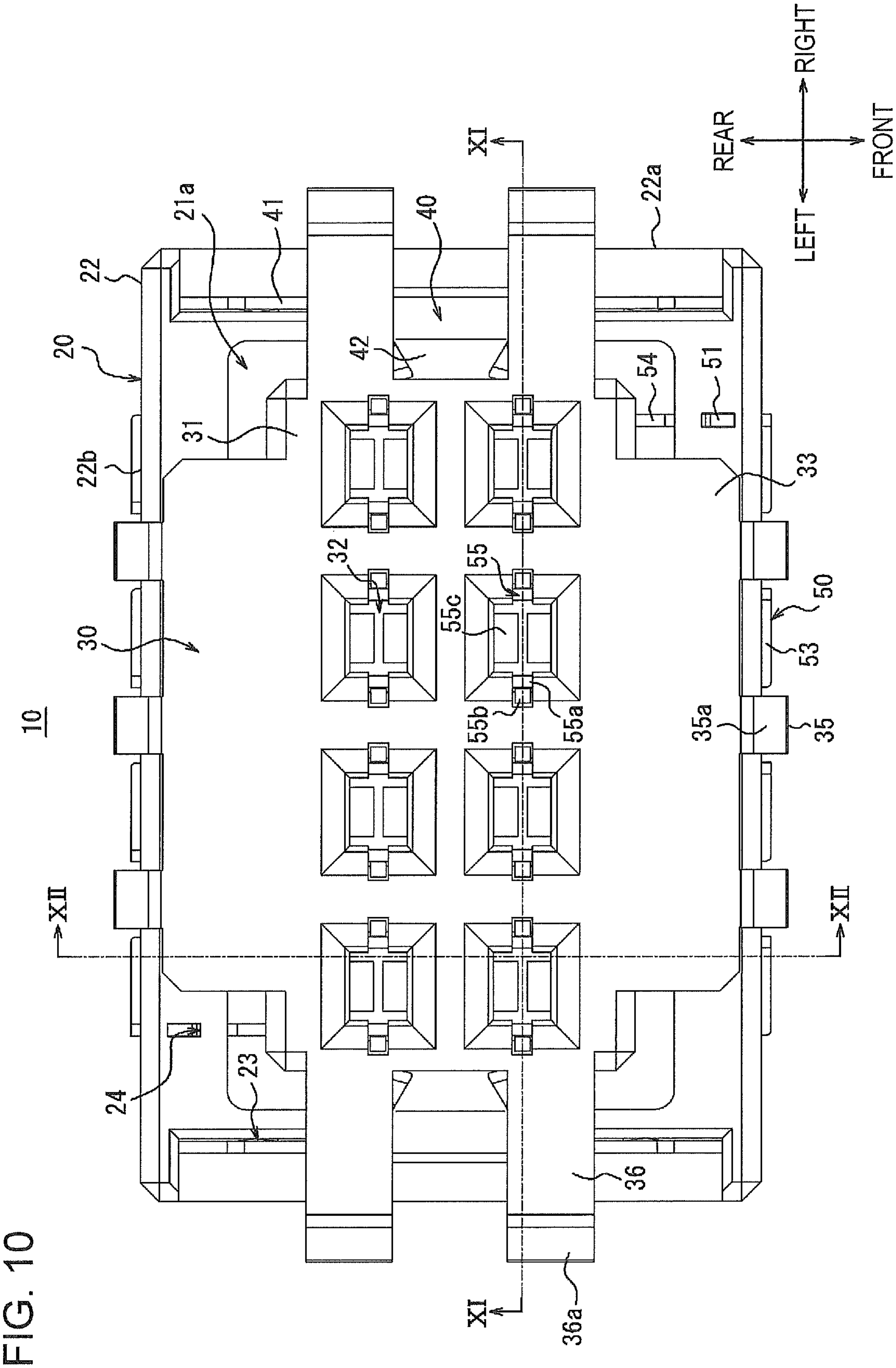
FIG. 10 is a top view of the socket in FIG. 2.

FIG. 10 is a top view of the socket 10 in FIG. 2. The configuration of the socket 10 will be mainly described below with reference to FIG. 10.

The second accommodating portions 33 of the second insulator 30 overlap the long side walls 22*b* of the first insulator 20 when viewed in plan from above. On the lower side, each of the second accommodating portions 33 faces the corresponding one of the long side walls 22*b*. The first protrusions 35 of the second insulator 30 protrude outward from the second accommodating portions 33 in the direction orthogonal to the direction of fit between the connection object 60 and the socket 10. The first protrusions 35 are arranged along the second accommodating portions 33 in the longitudinal direction of the first insulator 20. Tips of the first protrusions 35 in the short-side direction of the first insulator 20 are located on the outer sides in the front-and-rear direction with respect to the long side walls 22*b* and the mounting portions 53 of the contacts 50. The mounting portions 53 of the contacts 50 are each located between adjacent ones of the first protrusions 35 when viewed in plan in the direction of fit. Each of the mounting portions 53 partially juts outward in the front-and-rear direction from the long side wall 22*b* of the first insulator 20.

The second protrusions 36 of the second insulator 30 protrude from the base 31 in the longitudinal direction of the first insulator 20 that is the direction in which the long side walls 22*b* of the first insulator 20 extend. The second protrusions 36 overlap the short side walls 22*a* of the first insulator 20 when viewed in plan from above. On the lower side, the second protrusions 36 face the short side walls 22*a*. Tips of the second protrusions 36 in the longitudinal direction of the first insulator 20 are located on the outer sides in the left-and-right direction with respect to the short side walls 22*a* of the first insulator 20.

Figure 11:
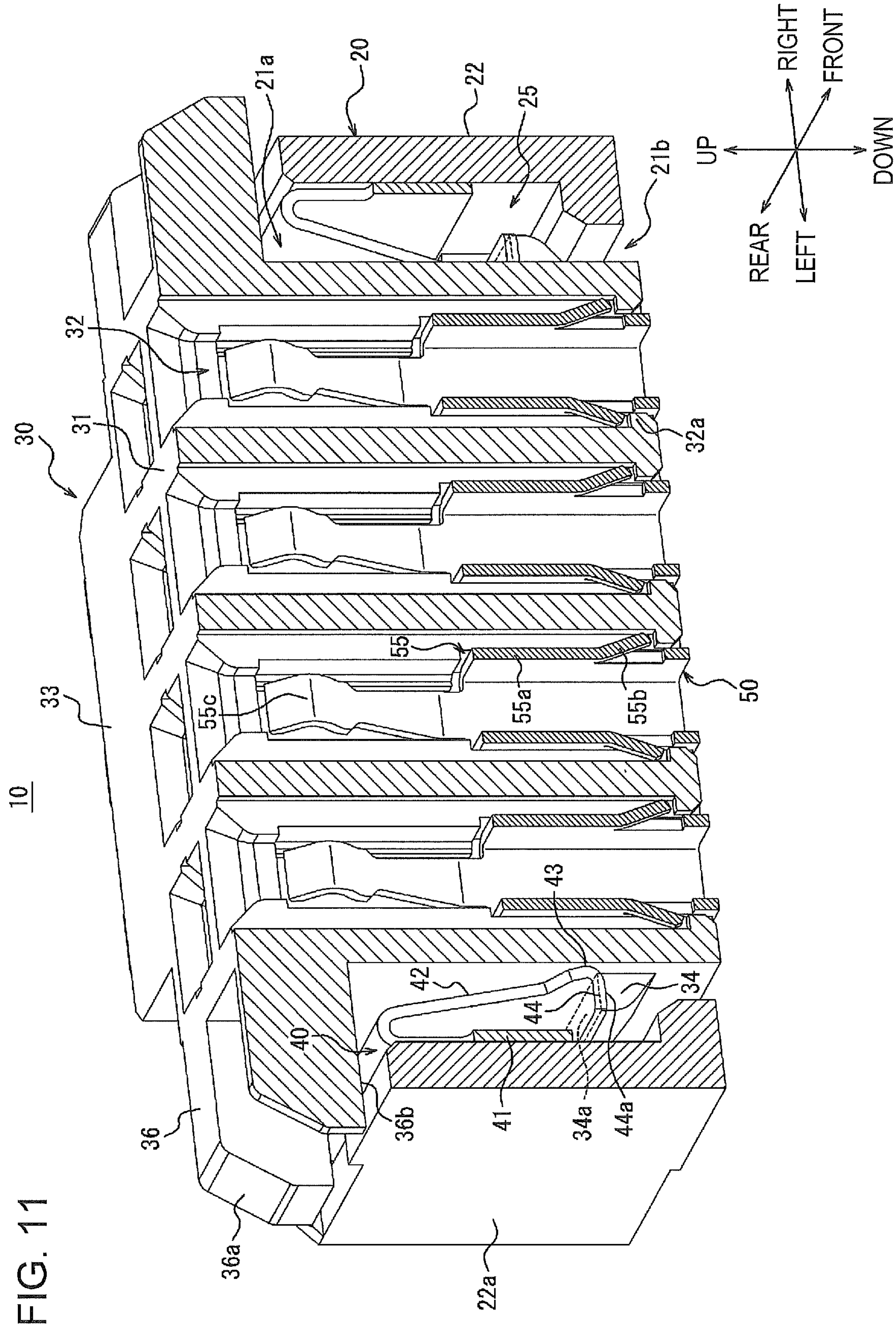
FIG. 11 is a sectional perspective view taken along double arrow line XI-XI in FIG. 10.
Figure 12:
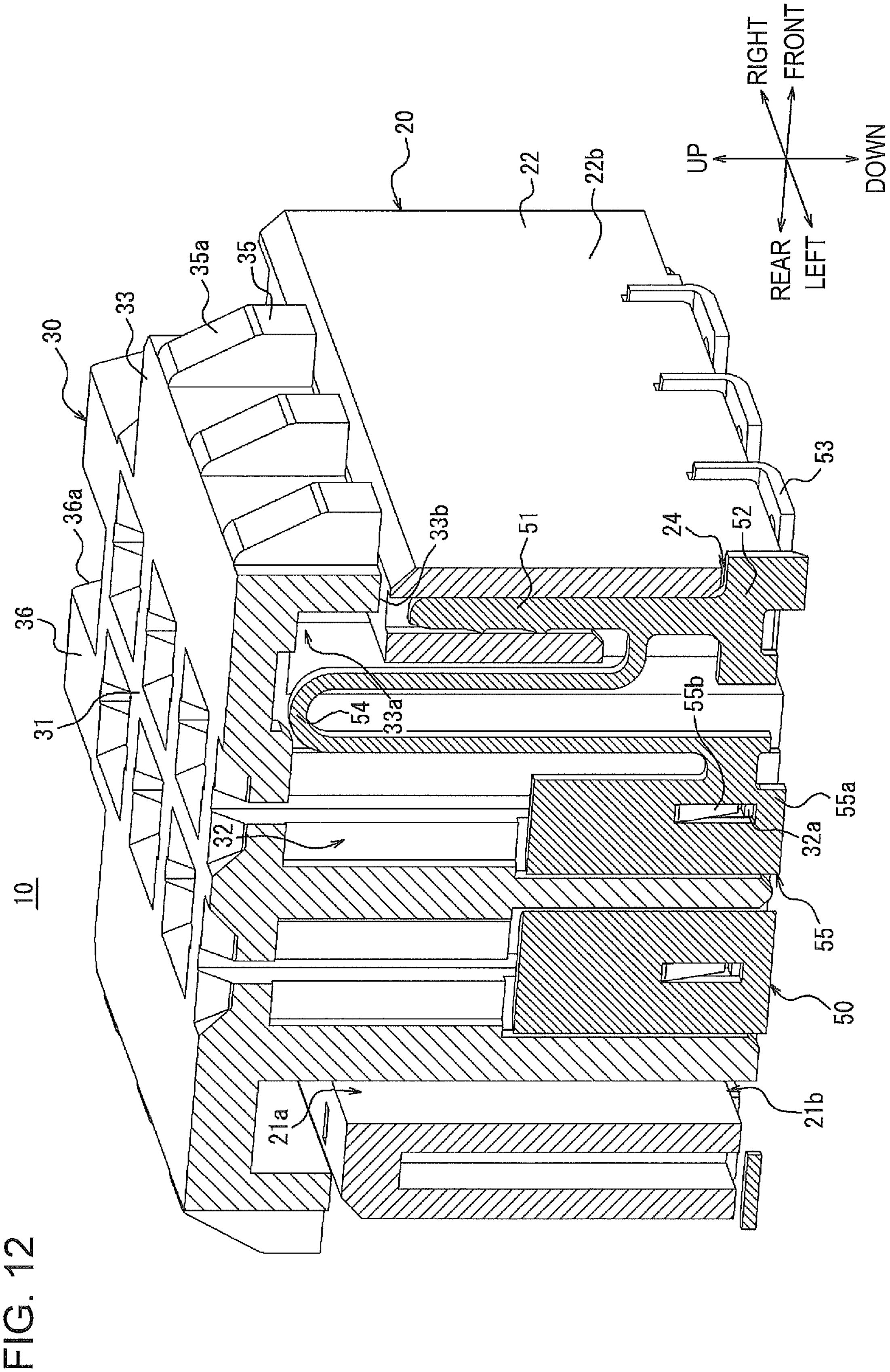
FIG. 12 is a sectional perspective view taken along double arrow line XII-XII in FIG. 10.

FIG. 11 is a sectional perspective view taken along double arrow line XI-XI in FIG. 10. FIG. 12 is a sectional perspective view taken along double arrow line XII-XII in FIG. 10. The configuration of the socket 10 will be mainly described below with reference to FIGS. 11 and 12.

As illustrated in FIG. 11, the metal fittings 40 are fitted in the first insulator 20 in such a manner that the base 41 of each of the metal fittings 40 is supported by the corresponding one of the short side walls 22*a* of the first insulator 20. The biasing portion 42 of each metal fitting 40 projects from the base 41 of the metal fitting 40 and extends obliquely in the projection direction toward the second insulator 30. Each biasing portion 42 is provided in such a manner that the connection portion between the base 41 and the biasing portion 42 is located on the inner side with respect to an edge of the short side wall 22*a* of the first insulator 20 in the direction of fit between the connection object 60 and the socket 10.

The contacting portions 43 of the metal fittings 40 are in contact with the respective side surfaces on the left and right of the base 31 of the second insulator 30. The pair of metal fittings 40 is disposed in such a manner that the second insulator 30 is fitted between the contacting portions 43 of the metal fittings 40 in the arrangement direction of the contacts 50. The pullout-preventing portions 44 of the metal fittings 40 face the respective pullout prevention target portions 34 of the second insulator 30 in the direction of fit between the connection object 60 and the socket 10. More specifically, the horizontal surface 44*a* of each pullout-preventing portion 44 is oriented downward to face the horizontal surface 34*a* of the corresponding pullout prevention target portion 34. Each of the accommodating portions 25 of the first insulator 20 is a recess in an inner wall facing the corresponding one of the surfaces of the second insulator 30 that are provided with the respective pullout prevention target portions 34. The accommodating portions 25 overlap the respective pullout-preventing portions 44 and the respective pullout prevention target portions 34 when viewed in the direction of fit.

The pullout-preventing portions 55*b* on the movable portion 55 of each contact 50 protrude from side surfaces on the left and right of the base 55*a* and extend obliquely toward the inner wall of the corresponding first accommodating portion 32 of the second insulator 30. More specifically, the contacts 50 each include a pair of pullout-preventing portions 55*b*. The two pullout-preventing portions 55*b* protrude from two opposite side surfaces on the left and right of the base 55*a* of the movable portion 55 and extend obliquely toward the inner wall of the first accommodating portion 32 of the second insulator 30. Each pullout prevention target portion 32*a* of the second insulator 30 includes part of the inner wall on the left and right of the corresponding first accommodating portion 32 and faces tips of the pullout-preventing portions 55*b* of the corresponding contact 50 in the direction of fit between the connection object 60 and the socket 10. When the contacts 50 are installed into the second insulator 30 from below, the pullout-preventing portions 55*b* of each contact 50 come into contact with the outer side of the corresponding pullout prevention target portion 32*a* of the second insulator 30 and are elastically deformed inward from the left and the right, respectively. Once the contacts 50 are completely installed in the second insulator 30, the pullout-preventing portions 55*b* revert to a previous state in which they are not elastically deformed. Each pair of pullout-preventing portions 55*b* and the corresponding pullout prevention target portion 32*a* face each other in the up-and-down direction within the second insulator 30.

The second protrusions 36 of the second insulator 30 face the short side walls 22*a* of the first insulator 20 in the up-and-down direction. More specifically, the facing sections 36*b* of the second protrusions 36 face upper surfaces of the short side walls 22*a* of the first insulator 20 in the up-and-down direction.

As illustrated in FIG. 12, the contacts 50 are fitted in the first insulator 20. More specifically, an upper part of the first support portion 51 of each contact 50 is caught and retained in the corresponding contact catch groove 24 of the first insulator 20. Likewise, the second support portion 52 of each contact 50 is caught and retained in the corresponding contact catch groove 24 of the first insulator 20. A support portion composed of the first support portion 51 and the second support portion 52 of the contact 50 is supported by the first insulator 20 accordingly.

The second accommodating portions 33 of the second insulator 30 protrude toward the first insulator 20 in the direction orthogonal to the direction of fit between the connection object 60 and the socket 10. Each of the second accommodating portions 33 and the corresponding one of the long side walls 22*b* of the first insulator 20 face each other in the direction of fit. More specifically, the facing sections 33*b* of each of the second accommodating portions 33 and an upper surface of the corresponding one of the long side walls 22*b* of the first insulator 20 face each other in the up-and-down direction. Tips of the elastic portions 54 in the direction of fit are located within the second accommodating portions 33 in the direction of fit. More specifically, upper ends of the elastic portions 54 are located within the recesses 33*a* of the second accommodating portions 33.

The elastic portion 54 of each contact 50 is linked to the support portion composed of the first support portion 51 and the second support portion 52 of the contact 50 and is located between the support portion and the second insulator 30. The support portion and the elastic portion 54 of each contact 50 extend flatly in the arrangement-direction of the contacts 50, that is, in the longitudinal direction of the first insulator 20. In other words, the support portion and the elastic portion 54 of each contact 50 extend flatly in a plane orthogonal to the longitudinal direction of the first insulator 20.

As illustrated in FIGS. 11 and 12, each of the contacts 50 extends to the inside of the second insulator 30 and is disposed within the second insulator 30. More specifically, the movable portion 55 and a section extending from a bending point of the inverted U shape of the elastic portion 54 toward the inside of the second insulator 30 are accommodated in the first accommodating portion 32 of the second insulator 30. In this state, the movable portion 55 of the contact 50 is farther than the elastic portion 54 of the contact 50 from the periphery of the second insulator 30 and is movable relative to the second insulator 30. When the elastic portion 54 is not elastically deformed, a predetermined clearance is left between the inner wall of the first accommodating portion 32 of the second insulator 30 and each of the elastic portion 54 and the movable portion 55. Similarly, a predetermined clearance is left between the second accommodating portion 33 of the second insulator 30 and the elastic portion 54.

The second insulator 30 is placed in a predetermined position within the first insulator 20. The second insulator 30 can be shifted from the predetermined position, that is, the second insulator 30 is movable relative to the first insulator 20. The term "predetermined position" herein refers to an original position of the second insulator 30, that is, the position of the second insulator 30 in a state in which the biasing portions 42 of the metal fittings 40 and the elastic portions 54 of the contacts 50 are not elastically deformed. The pair of metal fittings 40 supports the second insulator 30. More specifically, the contacting portions 43 of the metal fittings 40 on the left and right support the second insulator 30 in such a manner that the second insulator 30 is suspended and kept apart from the first insulator 20 and the contacts 50.

In this state, the base 31 of the second insulator 30 is placed in a predetermined position on the inner side with respect to the outer peripheral wall 22 of the first insulator 20 and is surrounded in all directions by the outer peripheral wall 22. An upper part of the base 31 juts above the opening 21*a* of the first insulator 20 and extends upward beyond an upper surface of the outer peripheral wall 22. The base 31 except for the upper part is located on the inner side with respect to the opening 21*a*.

The mounting portions 53 of the contacts 50 of the socket 10 having the structure described above are soldered to a circuit pattern on a mounting surface of the circuit board CB. The mounting portions 47 of the metal fittings 40 are soldered to a ground pattern or the like on the mounting surface. The socket 10 is mounted on the circuit board CB accordingly. In addition to the socket 10, electronic components, such as a central processing unit (CPU), a controller, and memory, are mounted on the mounting surface of the circuit board CB.

The following focuses on the workings of the socket 10 having a floating structure.

The mounting portions 47 of the metal fittings 40 and the mounting portions 53 of the contacts 50 are soldered to the circuit board CB such that the first insulator 20 is fixed to the circuit board CB. The biasing portions 42 of the metal fittings 40 and the elastic portions 54 of the contacts 50 are elastically deformable. For this reason, the second insulator 30 is movable relative to the first insulator 20 fixed to the circuit board CB.

When the second insulator 30 in the state illustrated in FIG. 11 moves relative to the first insulator 20 in the left-and-right direction, the biasing portion 42 of one of the metal fittings 40 is elastically deformed inward to move closer to the corresponding accommodating portion 25 of the first insulator 20. The lateral movement of the second insulator 30 causes the biasing portion 42 of the metal fitting 40 to undergo elastic deformation such that the contacting portion 43 of the metal fitting 40 comes into contact with the second insulator 30 in a manner so as to bias the second insulator 30 toward the predetermined position. In this state, the contacting portion 43 of the other metal fitting 40 is kept in contact with the second insulator 30.

When the second insulator 30 in the state illustrated in FIG. 12 moves relative to the first insulator 20 in the front-and-rear direction and the left-and-right direction, the inner wall of each of the first accommodating portions 32 of the second insulator 30 comes into contact with the movable portion 55 of the corresponding one of the contacts 50 such that the elastic portions 54 of the contacts 50 are deformed in a predetermined direction. While undergoing the elastic deformation caused by the second insulator 30 moving relative to the first insulator 20, the elastic portions 54 bias the second insulator 30 toward the predetermined position.

The short side walls 22*a* of the first insulator 20 keep the second insulator 30 from moving excessively relative to the first insulator 20. More specifically, when the second insulator 30 in the state illustrated in FIG. 11 undergoes a large displacement in the left-and-right direction, the side surfaces on the left and right of the base 31 of the second insulator 30 come into contact with inner side surfaces of the short side walls 22*a*. The pullout prevention target portions 34 of the second insulator 30 and the pullout-preventing portions 44 of the metal fittings 40 are accommodated in the accommodating portions 25 of the first insulator 20. The second insulator 30 is thus kept from moving further outward in the left-and-right direction.

The long side walls 22*b* of the first insulator 20 keep the second insulator 30 from moving excessively relative to the first insulator 20. More specifically, when the second insulator 30 in the state illustrated in FIG. 12 undergoes a large displacement in the front-and-rear direction, the side surfaces on the front and rear of the base 31 of the second insulator 30 come into contact with inner side surfaces of the long side walls 22*b*. The second insulator 30 is thus kept from moving further outward in the front- and rear direction.

The long side walls 22*b* of the first insulator 20 keep the second insulator 30 from moving excessively relative to the first insulator 20. More specifically, when the second insulator 30 in the state illustrated in FIG. 12 undergoes a large displacement in the downward direction, the facing sections 33*b* of the second accommodating portions 33 of the second insulator 30 come into contact with the upper surfaces of the long side walls 22*b*. Likewise, lower surfaces of the first protrusions 35 of the second insulator 30 can possibly come into contact with the upper surfaces of the long side walls 22*b*. The second insulator 30 is thus kept from moving further in the downward direction.

The short side walls 22*a* of the first insulator 20 keep the second insulator 30 from moving excessively relative to the first insulator 20. More specifically, when the second insulator 30 in the state illustrated in FIG. 11 undergoes a large displacement in the downward direction, the facing sections 36*b* of the second protrusions 36 of the second insulator 30 can possibly come into contact with the upper surfaces of the short side walls 22*a*. The second insulator 30 is thus kept from moving further in the downward direction.

The following focuses on the ways in which the socket 10 having the floating structure works when the connection object 60 is connected to the socket 10.

Figure 13:
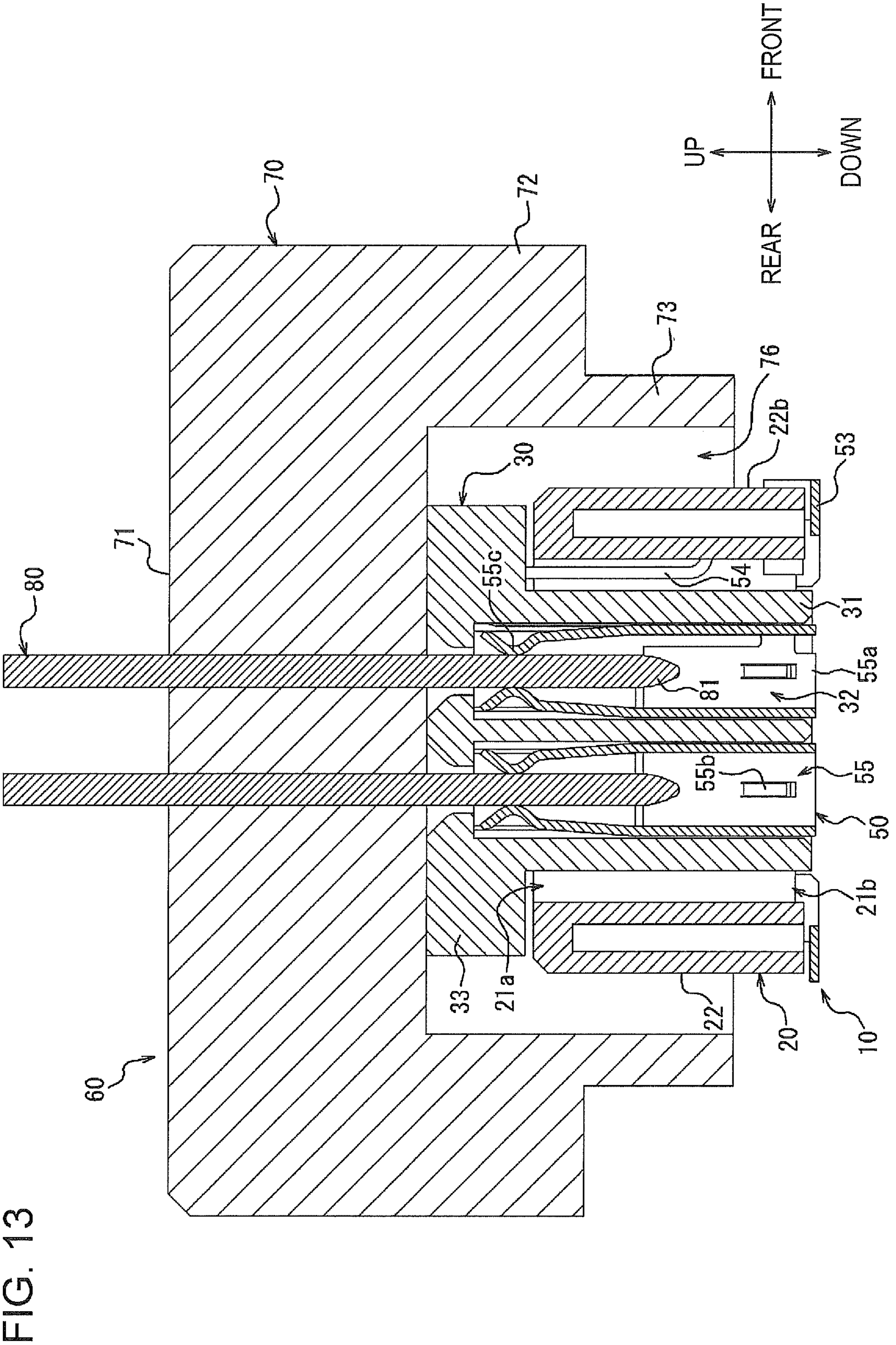
FIG. 13 is a sectional view taken along double arrow line XIII-XIII in FIG. 1.

FIG. 13 is a sectional view taken along double arrow line XIII-XIII in FIG. 1.

The socket 10 having the floating structure described above and the connection object 60 are placed face to face in the up-and-down direction in such a manner that the front-rear position and the left-right position of the connection object 60 are substantially in agreement with those of the socket 10. The connection object 60 is then shifted in a downward direction. There may be some misalignment between the socket 10 and the connection object 60 in the front-and-rear direction. In such a case, the inclined surfaces 74*a* of the guide portions 74 of the insulator 70 come into contact with the guide surfaces 35*a* of the first protrusions 35 of the second insulator 30. The second insulator 30 then moves relative to the first insulator 20. This is due to the floating structure of the socket 10. The connection object 60 is guided into the socket 10 accordingly.

Likewise, there may be some misalignment between the socket 10 and the connection object 60 in the left-and-right direction. In such a case, the inclined surfaces 75*a* of the guide portions 75 of the insulator 70 come into contact with the guide surfaces 36*a* of the second protrusions 36 of the second insulator 30. The second insulator 30 then moves relative to the first insulator 20. This is due to the floating structure of the socket 10. The connection object 60 is guided into the socket 10 accordingly.

The connection object 60 is then shifted further in the downward direction, and the accommodating portion 76 of the insulator 70 is fitted over the socket 10. In this state, the contacts 50 of the socket 10 are in contact with the terminals 80 of the connection object 60. More specifically, each pair of contacting portions 55*c* of the contacts 50 is in contact with the corresponding terminal 80 in such a manner that the two contacting portions 55*c* are opposite to each other with the terminal 80 therebetween in the front-and-rear direction. The two contacting portions 55*c* of each contact 50 are elastically deformed outward to some extent in the front-and-rear direction such that the spacing between the two contacting portions 55*c* in the front-and-rear direction is increased.

The socket 10 and the connection object 60 are fully connected to each other accordingly. In this state, the contacts 50 and the terminals 80 form an electrical connection between the circuit board CB and the module.

The two contacting portions 55*c* of each contact 50 exert elastic force inward in the front-and-rear direction to sandwich the corresponding terminal 80 of the connection object 60 from the front and the rear, respectively. When the connection object 60 is withdrawn from the socket 10, a force that opposes the pressing force exerted on the terminals 80 of the connection object 60 acts on the second insulator 30 in the direction of withdrawal, that is, in an upward direction by way of the contacts 50.

If the force causes the second insulator 30 to move upward, the pullout-preventing portions 44 of the metal fittings 40 press-fitted in the first insulator 20 as illustrated in FIG. 11 would keep the second insulator 30 from moving further upward and disengaging from the first insulator 20. More specifically, this pullout prevention mechanism is as follows. The pullout-preventing portion 44 of each of the metal fittings 40 is located immediately above the corresponding one of the pullout prevention target portions 34 of the second insulator 30. The horizontal surface 44*a* of each pullout-preventing portion 44 and the horizontal surface 34*a* of the corresponding pullout prevention target portion 34 face each other in the up-and-down direction. When the second insulator 30 starts moving upward, the horizontal surface 34*a* of each pullout prevention target portion 34 comes into contact with the horizontal surface 44*a* of the corresponding pullout-preventing portion 44. The second insulator 30 is thus kept from moving further in the upward direction.

Likewise, if the second insulator 30 moves in the upward direction for some reason, the pullout-preventing portions 55*b* of the contacts 50 accommodated in the respective first accommodating portions 32 of the second insulator 30 as illustrated in FIG. 11 keep the second insulator 30 from moving further in the upward direction and disengaging from the contacts 50 of the second insulator 30. More specifically, this pullout prevention mechanism is as follows. The pair of pullout-preventing portions 55*b* of each of the contacts 50 is located immediately above the corresponding one of the pullout prevention target portions 32*a* of the second insulator 30. The tip of each pair of pullout-preventing portions 55*b* and the corresponding pullout prevention target portion 32*a* face each other in the up-and-down direction. When the second insulator 30 starts moving upward, each pullout prevention target portion 32*a* comes into contact with the tip of the corresponding pair of pullout-preventing portions 55*b*. The second insulator 30 is thus kept from moving further in the upward direction.

The socket 10 according to the present embodiment improves the reliability of connection between the socket 10 and the connection object 60. More specifically, the second insulator 30 is placed in the predetermined position within the first insulator 20, and the second insulator 30 placed in the predetermined position is movable relative to the first insulator 20 such that the reliability of connection between the socket 10 and the connection object 60 is improved in light of possible misalignment between them. The second insulator 30 is movable and can thus accommodate misalignment between the connection object 60 and the socket 10 during, for example, automated assembling in which the socket 10 and the connection object 60 are connected together by assembling equipment. Furthermore, the movable portions 55 of the contacts 50 are movable relative to the second insulator 30 such that the reliability of connection is improved in light of possible misalignment of the terminals 80 of the connection object 60. More specifically, the movable portions 55 of the contacts 50 accommodate misalignment of the terminals 80 of the connection object 60. That is, the socket 10 improves the reliability of connection between the socket 10 and the connection object 60 in light of the two different misalignment conditions. These features create a synergistic effect of enhancing the efficiency in connecting the connection object 60 to the socket 10.

In a state in which the connection object 60 is yet to be connected to the socket 10, the biasing portions 42 of the metal fittings 40 in the socket 10 can shift the second insulator 30 relative to the first insulator 20 so as to place the second insulator 30 in the predetermined position. This eliminates or reduces the possibility that the connection object 60 and the second insulator 30 will become misaligned when the connection object 60 is connected to the socket 10. It is thus possible to achieve a good fit between the connection object 60 and the socket 10.

In a case where the contacts 50 have a small number of poles, the second insulator 30 may be biased toward the predetermined position relative to the first insulator 20 by application of a small bias force through the contacts 50. With the contacts 50 having a small number of poles, it is thus possible for the biasing portions 42 of the metal fittings 40 in the socket 10 to shift the second insulator 30 relative to the first insulator 20 so as to place the second insulator 30 in the predetermined position.

The contacts 50 include the pullout-preventing portions 55*b*, and the second insulator 30 includes the pullout prevention target portions 32*a* each facing the tips of the corresponding pair of pullout-preventing portions 55*b*. This eliminates or reduces the possibility that the second insulator 30 will move upward and will disengage from the contacts 50. The socket 10 has improved product reliability accordingly.

The contacts 50 each include a pair of pullout-preventing portions 55*b* such that each of the pullout prevention target portions 32*a* of the second insulator 30 faces the pullout-preventing portions 55*b* of the corresponding one of the contacts 50, with each pullout prevention target portion 32*a* being immediately below the two pullout-preventing portions 55*b* provided on the left and right of the corresponding contact 50. This enhances the effect of eliminating or reducing the possibility that the second insulator 30 will move upward and will disengage from the contacts 50. The socket 10 has improved product reliability accordingly.

The movable portions 55 of the contacts 50 each have a rectangular shape when viewed in plan from above. The inner wall of the second insulator 30 is thus protected from being scratched when coming into contact with the movable portions 55 undergoing displacement within the second insulator 30. This eliminates or reduces the possibility of inner breakage of the second insulator 30.

The contacts 50 each include a pair of contacting portions 55*c*. The two contacting portions 55*c* are provided on the front and rear of the contact 50 such that each contact 50 and the corresponding terminal 80 of the connection object 60 come into contact with each other at two opposite points in the front-and-rear direction. Each contact 50 is reliably in contact with the corresponding terminal 80 accordingly.

The support portion and the elastic portion 54 of each contact 50 extend flatly along the long sides of the first insulator 20; that is, the support portion and the elastic portion 54 extend flatly in a plane orthogonal to the longitudinal direction of the first insulator 20. Each contact 50 is thus prone to elastic deformation in the arrangement direction of the contacts 50. For this reason, the second insulator 30 is more likely to move in the arrangement direction of the contacts 50. That is, the second insulator 30 can move in the left-and-right direction to a greater extent. Thus, the socket 10 with a good floating structure can be successfully fabricated.

The mounting portion 53 of each contact 50 is bent to project from the support portion such that the area of contact between the mounting portion 53 and the circuit board CB is increased. Thus, the mounting portion 53 is more securely fastened to the circuit board CB and is less likely to come off the circuit board CB.

The upper ends of the elastic portions 54 of the contacts 50 are located within the second accommodating portions 33 of the second insulator 30. This eliminates or reduces the possibility that a short circuit will occur due to foreign matter coming into contact with the contacts 50. Furthermore, the elastic portions 54 will be protected from dynamic loads such as external impact, and as a result, the possibility of breakage of the contacts 50 under the dynamic loads is eliminated or reduced. The socket 10 has improved product reliability accordingly.

The first protrusions 35 of the second insulator 30 protrude from the second accommodating portions 33 such that the second insulator 30 undergoing a large displacement relative to the first insulator 20 will come into alignment with the first insulator 20 in the front-and-rear direction without fail. It is thus ensured that the second accommodating portions 33 and/or the first protrusions 35 face the upper surfaces of the long side walls 22*b*. The second insulator 30 is thus kept from moving excessively in the downward direction, and the possibility of breakage of the contacts 50 is eliminated or reduced accordingly.

The mounting portions 53 of the contacts 50 are each located between adjacent ones of the first protrusions 35 when viewed in plan from above. The mounting portions 53 of the contacts 50 are thus visible from above. This facilitates a visual check or an image-based check of the fastening of the mounting portions 53 to the circuit board CB.

The first protrusions 35 and the second protrusions 36 of the second insulator 30 define an outline that can be used as a guide for fitting the connection object 60 and the socket 10 together. This eliminates or reduces the possibility that each terminal 80 of the connection object 60 and the corresponding contact 50 of the socket 10 will become misaligned.

The socket 10 according to the present embodiment eliminates or reduces the possibility that misalignment will be produced between each terminal 80 of the connection object 60 and the second insulator 30 when the connection object 60 is connected to the socket 10. The contacting portions 43 of the metal fittings 40 bias the second insulator 30 toward the predetermined position when the elastic portions 54 undergo the elastic deformation caused by the second insulator 30 moving relative to the first insulator 20. When the connection object 60 is connected to the socket 10, the second insulator 30 displaced in the left-and-right direction can be placed back into the predetermined position in an effective manner by the metal fittings 40. The efficiency in connecting the connection object 60 to the socket 10 is enhanced accordingly.

Each of the pullout-preventing portions 44 of the metal fittings 40 and the corresponding one of the pullout prevention target portions 34 of the second insulator 30 face each other in the up-and-down direction such that the second insulator 30 is kept from moving further upward and disengaging from the first insulator 20. The socket 10 has improved product reliability accordingly.

Each of the accommodating portions 25 of the first insulator 20 accommodates the corresponding one of the pullout prevention target portions 34 of the second insulator 30 and the corresponding one of the pullout-preventing portions 44 of the metal fittings 40 when the second insulator 30 undergoes a large displacement in the left-and-right direction. Consequently, the side surfaces on the left and right of the base 31 of the second insulator 30 come into contact with the inner side surfaces of the respective short side walls 22*a* of the first insulator 20. In this way, the short side walls 22*a* effectively keep the second insulator 30 from moving excessively relative to the first insulator 20 in left-and-right direction. Furthermore, each of the pullout-preventing portions 44 is kept from contact with the corresponding one of the short side walls 22*a* when the biasing portions 42 of the metal fittings 40 are elastically deformed. While being kept from contact with the pullout-preventing portions 44 of the metal fittings 40, the short side walls 22*a* of the first insulator 20 are protected from being scratched by the pullout-preventing portions 44. The possibility of breakage of the first insulator 20 is eliminated or reduced accordingly.

The biasing portion 42 of each metal fitting 40 is bent into an inverted U shape to project from the base 41 such that the biasing portion 42 can be elastically deformed to the extent required to ensure the functioning of the socket 10 without the socket 10 being increased in height than it needs to be.

The connection portion between the base 41 and the biasing portion 42 of each metal fitting 40 is located within the first insulator 20 in the up-and-down direction such that the metal fitting 40 is kept from contact with the second insulator 30 when the second insulator 30 is shifted downward. This eliminates or reduces the possibility that the metal fittings 40 will cause breakage of the second insulator 30.

The metal fittings 40 each include the cutouts 48 extending downward from the respective sides of the connection portion between the biasing portion 42 and the base 41 to promote elastic deformation of the biasing portion 42. The biasing portions 42 subject to external force are elastically deformed to a greater extent than would be the case if the metal fittings 40 do not include the cutouts 48.

The base 41 of each of the metal fitting 40 is installed in the corresponding one of the short side wall 22*a* of the first insulator 20 such that the metal fittings 40 are firmly supported within the first insulator 20.

The second protrusions 36 of the second insulator 30 face the short side walls 22*a* of the first insulator 20 such that the second insulator 30 undergoing a large displacement relative to the first insulator 20 will come into alignment with the first insulator 20 in the left-and-right direction without fail. It is thus ensured that the facing sections 36*b* of the second protrusions 36 face the upper surfaces of the short side walls 22*a*. The second insulator 30 is thus kept from moving excessively in the downward direction, and the possibility of breakage of the contacts 50 is eliminated or reduced accordingly.

With tips of the first protrusions 35 being located on the outer side with respect to the long side walls 22*b* of the first insulator 20, two inner side surfaces of the accommodating portion 76 of the insulator 70 come into contact with the first protrusions 35 when the connection object 60 is connected to the socket 10. With tips of the second protrusions 36 being located on the outer side with respect to the short side walls 22*a* of the first insulator 20, the other two inner side surfaces of the accommodating portion 76 of the insulator 70 come into contact with the second protrusions 36 when the connection object 60 is connected to the socket 10. Furthermore, the guide surfaces 35*a*, the guide surfaces 36*a*, the guide portions 74, and the guide portions 75 help put the second insulator 30 correctly in place within the accommodating portion 76. The second insulator 30 is then placed back into the predetermined position such that the connection object 60 is guided into the socket 10.

The pair of projections 45 of each metal fitting 40 projects downward from the base 41 so as to provide ease of supporting the metal fittings 40 in the first insulator 20.

The contacts 50 are made of a metallic material of low elastic modulus. It is thus ensured that the second insulator 30 of the socket 10 can be shifted to the extent necessary by application of a small force to the second insulator 30. The second insulator 30 can move smoothly relative to the first insulator 20. This feature of the socket 10 provides ease of accommodating misalignment between the connection object 60 and the socket 10. The elastic portions 54 of the contacts 50 of the socket 10 damp vibrations caused by external factors. This prevents any undue stress from being exerted on the mounting portions 53, and the possibility of breakage at sites of connection between the socket 10 and the circuit board CB is eliminated or reduced accordingly. The socket 10 thus remains reliably in contact with the connection object 60.

The metal fittings 40 are press-fitted in the first insulator 20, and the mounting portions 47 of the metal fittings 40 are then soldered to the circuit board CB. In this way, the first insulator 20 is securely fixed to the circuit board CB with the metal fittings 40. The metal fittings 40 provide more secure fastening of the first insulator 20 to the circuit board CB.

Those skilled in the art, having benefit of this disclosure, will appreciate that this disclosure may be implemented in ways other than the above embodiment without departing from the spirit or essential features thereof. The above description merely provides examples. The scope of this disclosure is to be defined by the appended claims, not by the above description. Changes that fall within the scope of the claims and the equivalence thereof are embraced by this disclosure.

For example, each constituent component is not limited by the above description and the accompanying drawings in terms of, for example, shape, arrangement, orientation, and number, which may be changed in ways that ensure its functioning. Likewise, the above description is not limiting in terms of the procedure of how to assemble the socket 10. The socket 10 may be assembled in any way that ensures its functioning. For example, it is not required that the metal fittings 40 and the contacts 50 be press-fitted in the first insulator 20. The first insulator 20 may include integrally molded metal fittings 40 and/or integrally molded contacts 50.

In the embodiment described above, the contacts 50 each include a pair of pullout-preventing portions 55*b*. In some embodiments, the contacts 50 each may include one pullout-preventing portion 55*b*. It is required that the pullout-preventing portions 55*b* effectively eliminate or reduce the possibility that the second insulator 30 will move further upward and will disengage from the contacts 50.

In the embodiment described above, the movable portions 55 of the contacts 50 each have a rectangular shape when viewed in plan from above. In some embodiments, the movable portions 55 each may have a square-cornered C shape or a reverse square-cornered C shape or may have a circular shape or a triangular shape when viewed in plan from above.

In the embodiment described above, the contacts 50 each include a pair of contacting portions 55*c*. In some embodiments, the contacts 50 each may include one contacting portion 55*c* or each may include three or more contacting portions 55*c*. It is required that each contact 50 be reliably kept in contact with the corresponding terminal 80 of the connection object 60.

In the embodiment described above, the support portion and the elastic portion 54 of each contact 50 extend flatly in the arrangement direction of the contacts 50. In some embodiments, the procedure for forming a sheet into the support portions and the elastic portions 54 of the contacts 50 may include punching followed by a process of bending the sheet in the thickness direction at desired points.

In the embodiment described above, the mounting portion 53 of each contact 50 is bent to project from the second support portion 52. In some embodiments, the mounting portion 53 may project in the form of a straight line from the second support portion 52. It is required that the secure fastening of the mounting portion 53 to the circuit board CB be ensured.

In the embodiment described above, the second insulator 30 includes the first protrusions 35 protruding from the second accommodating portions 33. In some embodiments, the first protrusions 35 may be eliminated from the second insulator 30 to increase the dimension of each of the second accommodating portions 33 in the front-and-rear direction.

In the embodiment described above, the biasing portion 42 of each metal fitting 40 is bent into an inverted U shape to project from the base 41 and extends obliquely in the downward direction toward the second insulator 30. In some embodiments, the biasing portion 42 may be bent into a U shape to project from the base 41 and may extend obliquely in an upward direction.

In the embodiment described above, each metal fitting 40 includes two cutouts 48 extending downward from the respective sides of the connection portion between the biasing portion 42 and the base 41. The cutouts 48 extend toward the inside of the base 41. In some embodiments, the cutouts 48 may be eliminated from the metal fittings 40. It is required that the biasing portions 42 of the metal fittings 40 without the cutouts 48 be elastically deformable to the extent necessary. The biasing portions 42 of the metal fittings 40 without the cutouts 48 may be narrower than the biasing portions 42 of the metal fittings 40 in the embodiment described above.

In the embodiment described above, the second insulator 30 includes the second protrusions 36 protruding in the longitudinal direction of the first insulator 20 that is the direction in which the long side walls **22*b* of the first insulator 20 extend. On the lower side, the second protrusions 36 face the short side walls 22*a*. In some embodiments, the second protrusions 36 may be eliminated from the second insulator 30 to increase the dimension in the left-and-right direction of the upper part of the base 31 jutting above the opening 21*a* of the first insulator 20**.

In the embodiment described above, the metal fittings 40 each include a pair of projections 45 projecting downward from the base 41. The metal fittings 40 may have any desired shape that ensures their functioning. For example, the metal fittings 40 each may have an inverted T shape.

When the second insulator 30 in the state illustrated in FIG. 11 moves relative to the first insulator 20 in the left-and-right direction, the contacting portion 43 of one of the metal fittings 40 may be in contact with the second insulator 30 with a spacing being left between the contacting portion 43 of the other metal fitting 40 and the second insulator 30. In this state, the second insulator 30 may be in contact at any point with the first insulator 20 and/or the contacts 50.

In the embodiment described above, the contacts 50 are made of a metallic material of low elastic modulus. In some embodiments, the contacts 50 may be made of any desired material of known elastic modulus to ensure that the contacts 50 are elastically deformable to the extent necessary.

The socket 10, which has been described above, is intended for installation in an electronic device. The electronic device may be a vehicle-mounted device, such as a camera, a radar, a dashboard camera, or an engine control unit. Alternatively, the electronic device may be a vehicle-mounted device included in a vehicle-installed system, such as a car navigation system, an advanced driver-assistance system, or a security system. Still alternatively, the electronic device may be an information device, such as a personal computer, a copier, a printer, a fax machine, or a multifunction peripheral. The electronic device may be any other industrial device.

The improved reliability of connection between the socket 10 and the connection object 60 leads to efficient assembly of the electronic device. For example, the socket 10 with a good floating structure is advantageous in that misalignment between the socket 10 and the connection object 60 is accommodated, thus leading to efficient assembly of the electronic device. Likewise, the socket 10 eliminates or reduces the possibility that misalignment will be produced between each terminal 80 of the connection object 60 and the second insulator 30 when the connection object 60 is connected to the socket 10. This also leads to efficient assembly of the electronic device. The electronic device thus has the advantage of ease of manufacturability. The socket 10 is advantageous in that the possibility of breakage at sites of connection between the socket 10 and the circuit board CB is eliminated or reduced. The electronic device has improved product reliability accordingly.

REFERENCE SIGNS LIST

10 socket
20 first insulator
**21*a*, 21*b*** opening
22 outer peripheral wall
**22*a*** short side wall
**22*b*** long side wall
23 metal-fitting catch groove
24 contact catch groove
25 accommodating portion
30 second insulator
31 base
32 first accommodating portion
**32*a*** pullout-preventing portion
33 second accommodating portion (accommodating portion)
**33*a*** recess
**33*b*** facing section
3 pullout-preventing portion
**34*a*** horizontal surface
35 first protrusion (protrusion)
**35*a*** guide surface
36 second protrusion
**36*a*** guide surface
**36*b*** facing section
40 metal fitting
41 base
42 biasing portion
43 contacting portion
44 pullout-preventing portion
**44*a*** horizontal surface
45 projection
46 support portion
47 mounting portion
48 cutout
50 contact
51 first support portion (support portion)
52 second support portion (support portion)
53 mounting portion
54 elastic portion
55 movable portion
**55*a*** base
**55*b*** pullout-preventing portion
**55*c*** contacting portion
60 connection object

70 insulator
71 upper surface wall
72 outer peripheral wall
73 frame portion
74 guide portion
**74*a*** inclined surface
75 guide portion
**75*a*** inclined surface
76 accommodating portion
80 terminal
81 tip portion
CB circuit board

The invention claimed is:

1. A socket, comprising:

a first insulator in a form of a frame;

a second insulator that is disposed within the first insulator in a manner so as to be movable relative to the first insulator; and contacts each including a support portion supported by the first insulator, the contacts being disposed within the second insulator, wherein the contacts each include an elastic portion linked to the support portion and located between the support portion and the second insulator, a movable portion that is farther than the elastic portion from a periphery of the second insulator and is movable relative to the second insulator, and a contacting portion for contact with a connection object, wherein the second insulator includes an accommodating portion protruding toward the first insulator in a direction orthogonal to a direction of fit between the connection object and the socket, the accommodating portion and the first insulator face each other in the direction of fit, and a tip of the elastic portion in the direction of fit is located within the accommodating portion in the direction of fit, wherein the second insulator includes at least one protrusion protruding outward from the accommodating portion in a direction orthogonal to the direction of fit, and wherein the at least one protrusion comprises a plurality of protrusions arranged along the accommodating portion, and the mounting portions of the contacts are each located between adjacent ones of the protrusions when viewed in plan in the direction of fit.

2. The socket according to claim 1, wherein the contacts each include at least one pullout-preventing portion protruding from a side surface of the movable portion toward an inner wall of the second insulator, and the second insulator includes pullout prevention target portions being part of the inner wall and facing tips of the pullout-preventing portions in a direction of fit between the connection object and the socket.

3. The socket according to claim 2, wherein the at least one pullout-preventing portion comprises a pair of pullout-preventing portions, and each pullout-preventing portion of the pair of pullout-preventing portions protrudes from a corresponding one of two opposite side surfaces of the movable portion toward the inner wall of the second insulator.

4. The socket according to claim 1, wherein the movable portion has a rectangular shape when viewed in a direction of fit between the connection object and the socket.

5. The socket according to claim 1, wherein the support portion and the elastic portion extend flatly in a plane orthogonal to a longitudinal direction of the first insulator.

6. The socket according to claim 1, wherein the contacts each include a mounting portion that is bent to project from the support portion.

7. An electronic device, comprising the socket according to claim 1.

* * * * *